United States Patent [19]
Satoh et al.

[11] Patent Number: 6,137,956
[45] Date of Patent: Oct. 24, 2000

[54] SHAKE DETECTING/CORRECTING DEVICE FOR USE IN AN OPTICAL APPARATUS AND A SHAKE DETECTING/CORRECTING METHOD

[75] Inventors: Tomonori Satoh, Sakai; Yoshihiro Hara, Kishiwada; Kazuhiko Yukawa, Sakai; Keiji Tamai, Suita; Masatoshi Yoneyama, Izumi, all of Japan

[73] Assignee: Minolta Co., Ltd., Osaka, Japan

[21] Appl. No.: 09/162,598

[22] Filed: Sep. 29, 1998

[30] Foreign Application Priority Data

Oct. 2, 1997 [JP] Japan ................................ 9-269944
Oct. 2, 1997 [JP] Japan ................................ 9-269945

[51] Int. Cl.$^7$ .................................................. G03B 17/00

[52] U.S. Cl. ............................................................ 396/55

[58] Field of Search ............................... 396/54, 52, 55, 396/53; 348/208

[56] References Cited

U.S. PATENT DOCUMENTS

| 5,012,270 | 4/1991 | Sekine et al. | 396/54 |
| 5,365,304 | 11/1994 | Hamada et al. | 396/54 |
| 5,822,623 | 10/1998 | Urata et al. | 396/52 |

FOREIGN PATENT DOCUMENTS

| 8-051566 | 2/1996 | Japan . |
| 8-101420 | 4/1996 | Japan . |
| 5-204014 | 8/1996 | Japan . |

*Primary Examiner*—W. B. Perkey
*Attorney, Agent, or Firm*—Sidley & Austin

[57] ABSTRACT

A shake correcting device of a camera is provided with: a detector for detecting a shake of the camera relative to an object cyclically; a calculator for calculating a degree of variation of a plurality of detection results of the detector, and calculating a detection precision based on a calculated degree of variation; and a corrector for executing a shake correction of the camera based on a detection precision calculated by the calculator.

17 Claims, 18 Drawing Sheets

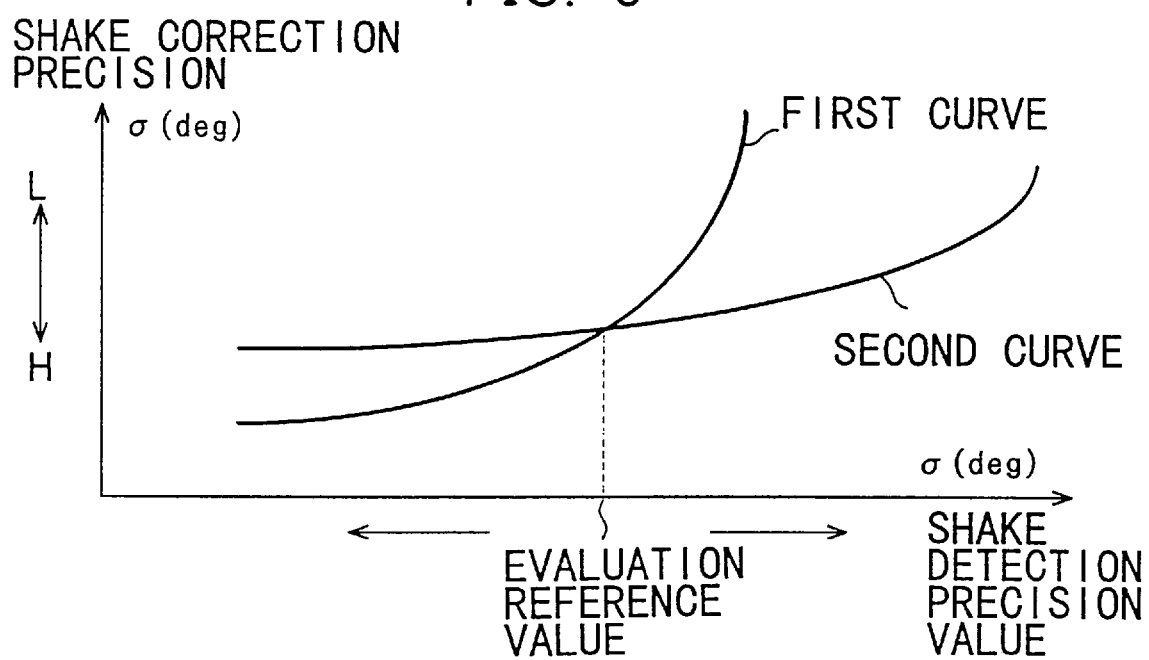

SHAKE DETECTING/CORRECTING DEVICE FOR USE IN AN OPTICAL APPARATUS AND A SHAKE DETECTING/CORRECTING METHOD

This application is based on patent application Ser. Nos. 9-269944 and 9-269945 filed in Japan, the contents of which is hereby incorporated by reference.

BACKGROUND OF THE INVENTION

This invention relates to a shake detecting and correcting device and a shake detecting and correcting method for an optical apparatus, such as camera.

Recently, there have been proposed various cameras capable of shake correction. One such camera is of an image processing type in which an area sensor comprising a multitude of photoelectric conversion elements such as Charge Coupled Devices (CCDs) arrayed in a two-dimensional form is used to detect a shake amount of an object light image particularly resulting from a camera shake, and a displacement of the object light image is corrected in such a manner as to cancel the shake amount (Japanese unexamined Patent Publication No. HEI 8-51566).

More specifically, an instant object image is extracted during a sensing operation by the area sensor, and the extracted object image is compared with a base image to detect a shake amount. An estimative shake amount is calculated based on plural shake amounts to move a shake correction lens in such a direction as to cancel the shake amount.

In the case where a shake amount is detected according to the image processing system using an area sensor such as CCD, a received light amount on each photoelectric conversion elements of the area sensor varies as the luminance of an object light image changes due to a change of a photographic condition and the like. Accordingly, a luminance variation is involved in the picked up object light image. If a shake detection is performed based on picked up image data including a luminance variation, an estimative shake amount will be affected by the luminance variation, thereby making it impossible to perform a proper shake correction.

SUMMARY OF THE INVENTION

It is an object of the invention to provide a shake correcting device, a shake detecting device, a shake correcting method, and shake detecting method which have overcome the problems residing in the prior art.

According to an aspect of the invention, a shake correcting device for use in an optical apparatus, the shake correcting device comprises: a detector which detects a shake of the optical apparatus relative to an object cyclically; a calculator which calculates a degree of variation of a plurality of detection results of the detector, and calculates a detection precision based on a calculated degree of variation; and a corrector which executes a shake correction of the optical apparatus based on a detection precision calculated by the calculator.

According to another aspect of the invention, a shake detecting device for use in an optical apparatus, the shake detecting device comprises: a detector which detects a shake of the optical apparatus relative to an object cyclically; an evaluator which evaluates a detection precision based on a plurality of detection results of the detector; a setter which sets a condition for calculation of a shake amount based on an evaluated detection precision; and a calculator which calculates a shake amount using a set condition.

According to still another aspect of the invention, a method for correcting a shake of an optical apparatus, the method comprises the steps of: detecting a shake of the optical apparatus relative to an object cyclically; calculating a degree of variation of a plurality of detection results; calculating a detection precision based on a calculated degree of variation; and executing a shake correction of the optical apparatus based on a calculated detection precision.

According to yet still another aspect of the invention, a method for detecting a shake of an optical apparatus, the method comprises the steps of: detecting a shake of the optical apparatus relative to an object cyclically; evaluating a detection precision based on a plurality of detection results; setting a condition for calculation of a shake amount based on an evaluated detection precision; and calculating a shake amount using a set condition.

These and other objects, features and advantages of the present invention will become more apparent upon a reading of the following detailed description and accompanying drawings.

BRIEF DESCRIPTION OF THE DRAWINGS

FIG. 9 is a graph showing a simulation result when evaluating a shake detection precision using the first parameter and the second parameter;

DETAILED DESCRIPTION OF THE PREFERRED EMBODIMENT OF THE INVENTION

Figure 1:
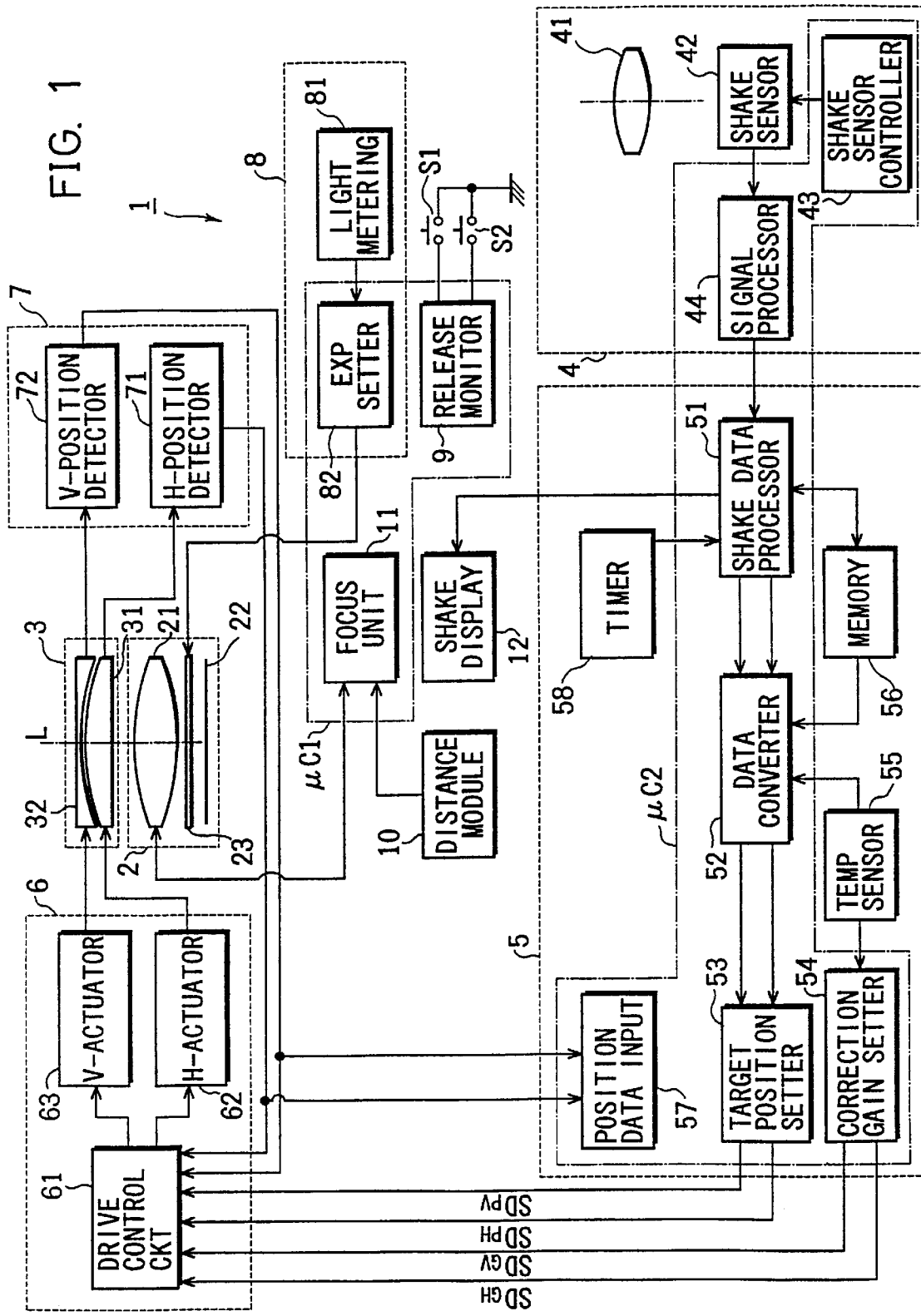
FIG. 1 is a block diagram of a camera embodying the present invention.

FIG. 1 is a block diagram showing a control construction of a camera embodying the invention. A camera 1 includes a picture taking unit 2, a correction lens unit 3, a shake detecting unit 4, a shake correction unit 5, a driving unit 6, a position detecting unit 7, an exposure controlling unit 8, a shutter release monitoring unit 9, a distance metering module 10, a focusing unit 11, and a shake display unit 12.

The picture taking unit 2 includes a taking lens 21 having an optical axis L, a mechanism (not shown) for feeding a loaded film 22 to a focusing position on the optical axis L, and a shutter 23 disposed in front of the film 22, and is adapted to take up a light image of an object image.

The correction lens unit 3 includes horizontal and vertical shake correction lenses 31, 32 provided before the taking lens 21 and is adapted to correct a displacement of an object light image by a so-called prism method. The horizontal and vertical correction lenses 31, 32 have optical axes parallel to the optical axis L, respectively and are so supported as to be movable on a plane normal to the optical axis L in horizontal and vertical directions which are normal to each other.

Figure 2:
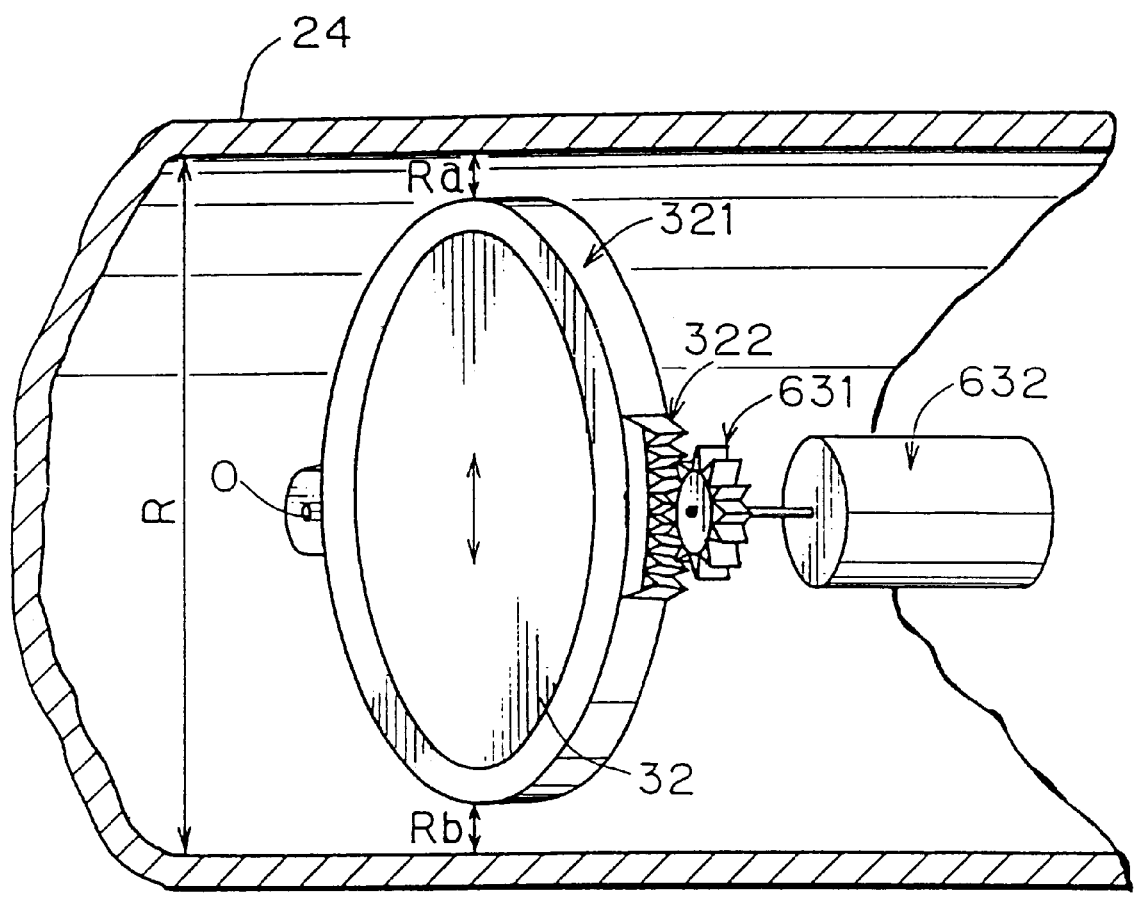
FIG. 2 is a perspective view of a vertical correction lens and its peripheral devices accommodated in a lens barrel of the camera.

FIG. 2 is a perspective view of the vertical correction lens 32 accommodated in a lens barrel 24 of the camera 1. The vertical correction lens 32 is held by a ring frame 321, and is pivotable about a pivot O on a vertical plane. A rack gear 322 is formed on a periphery of the ring frame 321 in a portion opposite to the pivot point O. A motor 632 has a pinion gear 631 which is meshed with the rack gear 322. When the motor 632 is driven, the pinion gear 631 is rotated, the ring frame 321 is consequently pivoted on the vertical plane by the way of the rack gear 322.

As can be seen clearly from FIG. 2, the vertical correction lens 32 is movable on the vertical plane within a space R that is substantially identical to an inner diameter of the lens barrel 24. The construction of the horizontal correction lens 31 is similar to that of the vertical correction lens 32 except that the horizontal correction lens 31 is movable in a horizontal plane normal to the vertical plane on which the vertical correction lens 32 moves. Accordingly, description on the construction of the horizontal correction lens 31 is omitted herein.

The shake detecting unit 4 includes a detection lens 41, a shake sensor 42, a shake sensor controller 43 and a signal processor 44, and is adapted to obtain image data used to detect a displacement of an object light image caused by a shake of the main body of the camera 1 with respect to the object.

The detection lens 41 has an optical axis parallel to the optical axis L of the taking lens 21 and focuses the object light image on the shake sensor 42 provided therebehind. The shake sensor 42 is an area sensor in which a multitude of photoelectric conversion elements such as a CCD are arrayed in a two-dimensional manner, and is adapted to sense the object light image focused by the detection lens 41 and to generate an electrical signal corresponding to the amount of received light. The image signal is a collection of the respective pixel signals of photoelectric conversion elements.

The shake sensor controller 43 controls the shake sensor 42 to sense the object light image for a predetermined time duration (time for accumulating electric charges, or simply referred to as "integration time") and to send the respective pixel signals obtained during this sensing operation to the signal processor 44. The signal processor 44 applies specified signal processings (signal amplification, offset adjustment, etc.) to the image signal sent from the shake sensor 42, and converts the analog image signal into digital image data.

Figure 3:
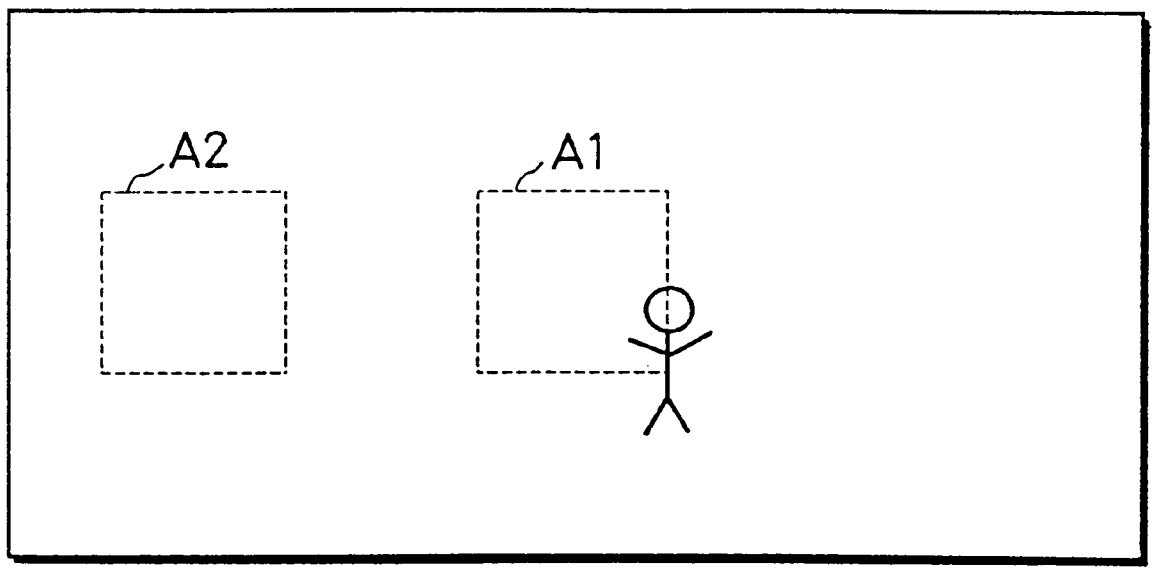
FIG. 3 is a diagram showing a position of sensing regions relative to an object image when the camera is set in a horizontal posture.

FIG. 3 is a diagram showing the position of sensing regions of the shake sensor 42. In this embodiment, the shake sensor 42 is so constructed as to sense two portions of the field of view, a center sensing region A1 directed to a center portion of the field of view and an end region A2 directed to an end portion of the field of view. More specifically, the shake sensor 42 is provided with two separate light receiving surfaces, one being adapted for receiving light rays from a center portion of the object and defining the center sensing region A1, and the other being adapted for receiving light rays from an end portion of the object and defining the end sensing region A2.

The shake sensor 42 may be provided with a single light receiving surface for receiving light rays from the whole object. In this case, an image signal from the shake sensor 42 is so processed in the signal processor 44 as to generate only two image data corresponding to the two sensing regions A1 and A2, respectively.

Next, the shake correction unit 5 is described with reference to FIG. 1. The shake correction unit 5 includes a shake data processor 51, a data converter 52, a target position setter 53, a correction gain setter 54, a temperature sensor 55, a memory 56, a position data input device 57, and a timer 58, and is adapted to set control data for allowing the driving unit 6 to generate a drive signal for shake correction.

The temperature sensor 55 is adapted to detect an ambient temperature of the camera 1. The memory 56 includes a RAM for temporarily storing data such as image data and shake amount data to be used in the shake data processor 51, and a ROM for storing a conversion coefficient to be used in the data converter 52, and the like.

Figure 4:
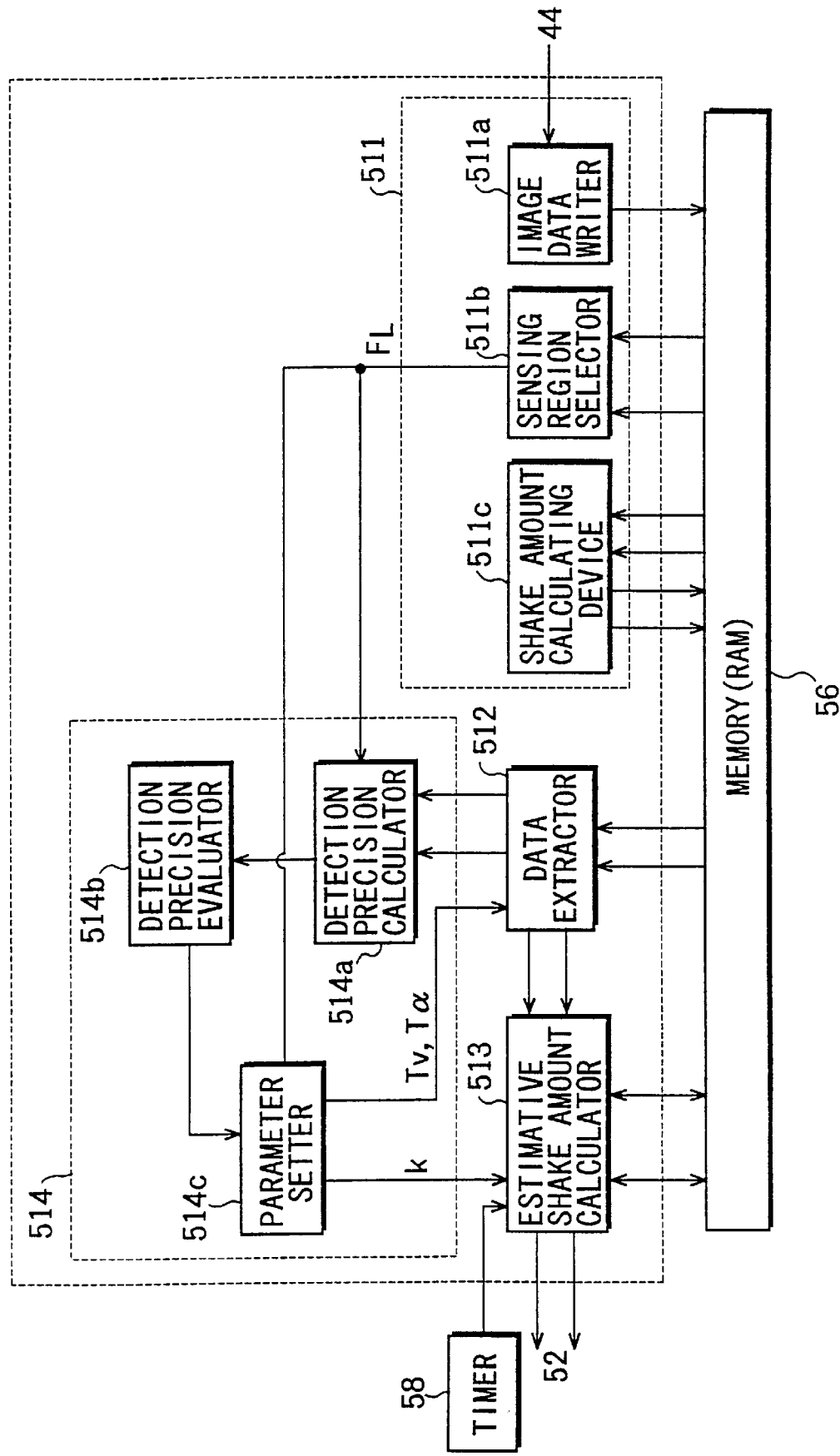
FIG. 4 is a block diagram showing a construction of a shake data processor provided in the camera.

FIG. 4 is a block diagram showing a construction of the shake data processor 51. The shake data processor 51 comprises an actual shake amount calculator 511, a data extractor 512, and an estimative shake amount calculator 513, and an evaluation setter 514. The shake data processor 51 calculates an actual shake amount based on image data from the signal processor 44 and then calculates an estimative shake amount based on a calculated actual shake amount.

The actual shake amount calculator 511 includes an image data writer 511a, a sensing region selector 511b, and an actual shake amount calculating device 511c. The image data writer 511a writes image data corresponding to the sensing regions A1 and A2 on specified addresses of the RAM of the memory 56.

The sensing region selector 511b selects either one of the sensing regions A1, A2 in accordance with a predetermined selection manner. For example, contrast values (spatial frequency) of the sensing regions A1 and A2 are compared, and either of the sensing regions A1, A2 is selected which provides image data having higher contrast value than the other.

The sensing region selector 511b judges whether a contrast value of the image data in the selected sensing region is lower than a predetermined value (threshold value). If it is judged that the contrast value is lower than the predetermined value, the sensing region selector 511b sets a low contrast flag $F_L$ at "1" to indicate a low contrast state. When the low contrast flag $F_L$ is set at "1", the sensing region selector 511b sets an estimative calculation allowance flag $F_P$ at "0". In other words, when the estimative calculation allowance flag $F_P$ is set at "0", computation is prohibited for evaluation of a detection precision of the shake detecting unit 4, which is described later. The allowance flag $F_P$ is set at "0" when the low contrast flag $F_L$ is set at "1" because of the fact that restoration into the satisfactory contrast state is difficult in a short period after entering into the low contrast state.

Next, the actual shake amount calculating device 511c is described. The actual shake amount calculating device 511c is adapted for calculating an actual shake amount based on instant image data of the sensing region A1 (A2) selected by the sensing region selector 511b and base image data. The base image data is image data obtained by the shake sensor 42 when the horizontal correction lens 31 and the vertical correction lens 32 are set in a specified position, e.g., in a center position from which the lens 31 or 32 is movable an equal distance (Ra=Rb in FIG. 2) in the opposite directions.

Specifically, the actual shake amount calculating device 511c uses latest image data stored in the memory 56. A shake amount is calculated by comparing in the unit of pixel instant image data that is sensed by the selected sensing region A1 (A2) with base image data. A shake amount in the horizontal direction and a shake amount in the vertical direction are calculated, and are temporarily stored in the memory 56.

The actual shake amount calculating device 511c sets latest estimative shake amounts in the horizontal and vertical directions stored in the memory 56 as shake amounts in the horizontal and vertical directions for an actual shake correction in the case where the number of shake amount calculations exceeds a predetermined value or the flag $F_L$ is set at "1". This is because the reliability for detection results is low in the low contrast state.

Next, shake amount data extraction of the data extractor 512 is described with reference to FIG. 5. The shake data extractor 512 extracts four shake amount data including a latest shake amount data from the memory 56 based on reference time spaces (time space or shake speed calculating time Tv for calculation of reliable shake speed, and time space or shake acceleration rate calculating time Tα for calculation of reliable shake acceleration rate) which are outputted from the evaluation setter 514.

Specifically, a first shake amount data Ea at a latest image pickup time t1 is extracted. This time is hereinafter referred to as "time ta". Extracted is a second shake amount data Eb at an image pickup time t3 (hereinafter, referred to as "time tb") which is prior to the time space Tv before the time ta and latest to the time ta. Extracted is a third shake amount data Ec at an image pickup time t5 (hereinafter, referred to as "time tc") which is prior to the time space Tα before the time ta and latest to the time ta. Finally, extracted is a fourth shake amount data Ed at an image pickup time t7 (hereinafter, referred to as "time td") which is prior to the time space Tv before the time tc and latest to time ta. These shake amount data Ea, Eb, Ec, Ed at the respective times ta, tb, tc, td are extracted with respect to the horizontal and vertical directions, and stored in the memory 56.

Figure 5:
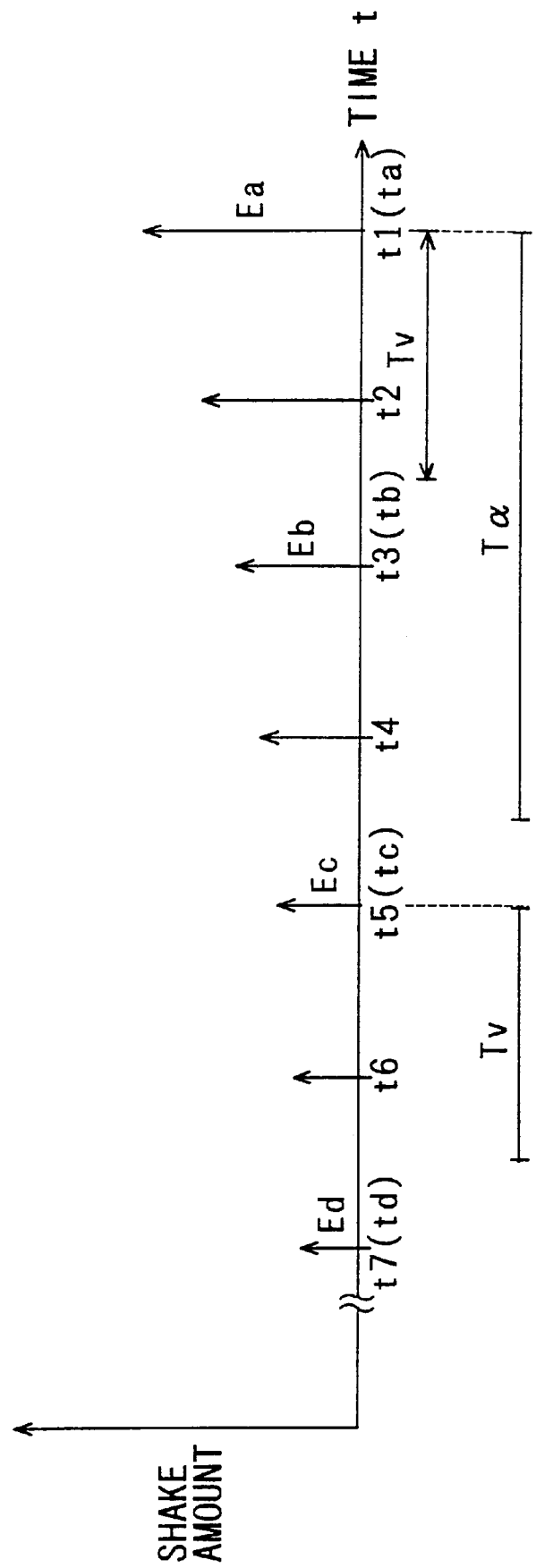
FIG. 5 is a diagram showing an extraction of shake amount data.

Referring to FIG. 5, the time t1 is the latest time, and the times t1, t2, t3 . . . are the middle point of each integration time. The respective upward arrows at the times t1, t2, t3, . . . indicate detected shake amount at the corresponding point of time. These shake amounts are stored in the memory 56.

In this embodiment, the evaluation setter 514 sets either a shorter one (e.g., Tv=5 ms) or a longer one (e.g., Tv=10 ms) of the reference time spaces as a parameter Tv to be set in the data extractor 512. The parameter Tv is described in detail later.

In the foregoing extraction, three shake amount data except for a shake amount data at a latest time are extracted on the basis of times which are prior to the reference time spaces before the latest time and latest to the latest time. Alternatively, it may be appreciated to extract such shake amount data on the basis of times which are nearest to the reference time spaces before the latest time, or on the basis of times which are within the reference time spaces before the latest time and further before the latest time.

Referring back to FIG. 4, the estimative shake amount calculator 513 calculates an estimative shake amount of the camera 1 based on the four shake amount data Ea, Eb, Ec, Ed which are selected with respect to the horizontal and vertical directions by the data extractor 512. Specifically, a shake speed V1 is calculated in accordance with Equation (1) based on the latest shake amount data Ea and the second shake amount data Eb, whereas a shake speed V2 is calculated in accordance with Equation (2) based on the third shake amount data Ec and the fourth shake amount data Ed. A shake acceleration rate α is calculated in accordance with Equation (3) based on the shake speeds V1, V2.

$$V1 = \frac{Ea - Eb}{ta - tb} \qquad \text{[Equation 1]}$$

$$V2 = \frac{Ec - Ed}{tc - td} \qquad \text{[Equation 2]}$$

$$\alpha = \frac{V1 - V2}{ta - tc} \qquad \text{[Equation 3]}$$

Subsequently, based on the assumption that the shake changes as uniformly accelerated motion, an estimative shake amount $E_P$ is calculated in accordance with Equation (4) based on the latest shake amount data Ea, the shake speed V1, the shake acceleration rate α, and a constant factor k set by the evaluation setter 514. The estimative shake amount $E_p$ is temporarily stored in the memory 56.

$$E_P = Ea + V1 \times T_P + \frac{1}{2} \times k \times \alpha \times T_P^2 \qquad \text{[Equation 4]}$$

wherein k denotes a correction coefficient smaller than 1, and $T_P$ denotes a time calculated in accordance with the equation: $T_P$=tr−ta+Td where tr is an instant time and Td is a time lag between a time of outputting an estimative shake amount from the shake data processor 51 and a drive completion time of the correction lens unit 3. Alternatively, the time Td may not be added to the time $T_P$.

As an altered form, the time $T_P$ may be calculated in accordance with the equation:

$$T_P = (\tfrac{1}{2}) \times T1 + T2 + T3 + T4 + Td$$

where T1 denotes an integration time of the shake sensor 42, T2 denotes a time required for transferring image data from the shake sensor 42 to the memory 56, T3 denotes a time for calculating a shake amount, and T4 denotes a time for calculating an estimative shake amount.

As mentioned earlier, the estimative shake amount calculator 513 sets the latest shake amount data in the horizontal and vertical directions stored in the memory 56 as the estimative shake amount data in the horizontal and vertical directions when the flag $F_L$ is set at "0" in the case where the number of shake amount calculations by the actual shake amount calculator 511 is smaller than the predetermined value or estimative calculation start number $N_P$.

The evaluation setter 514 comprises a detection precision calculator 514a, a detection precision evaluator 514b, and a parameter setter 514c. The detection precision calculator 514a calculates a shake detection precision value based on a detection result from the shake detecting unit 4, the detection precision evaluator 514b evaluates a calculated shake detection precision value, and the parameter setter 514c sets parameters such as the shake speed calculating time Tv, the shake acceleration rate calculating time Tα, and the constant factor k (hereinafter, merely referred to as "parameters Tv, Tα, k") in accordance with an evaluation result from the detection precision evaluator 514b. The detection precision calculator 514a calculates a shake detection precision value based on detection output from the shake detecting unit 4 using the shake acceleration rate.

Figure 6A:
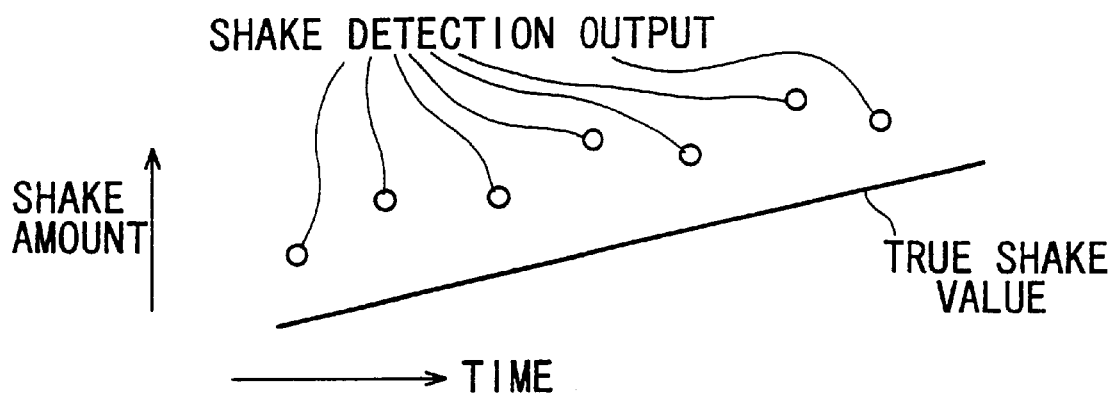
FIGS. 6A and 6B are diagrams showing a variation in shake detection output relative to a true shake value represented by the solid straight line, FIG. 6A showing a state that the shake detection output is affected by a structural failure such as an attachment displacement of a shake sensor, and FIG. 6B showing a state that the shake detection output is not affected by the structural failure.
Figure 6B:
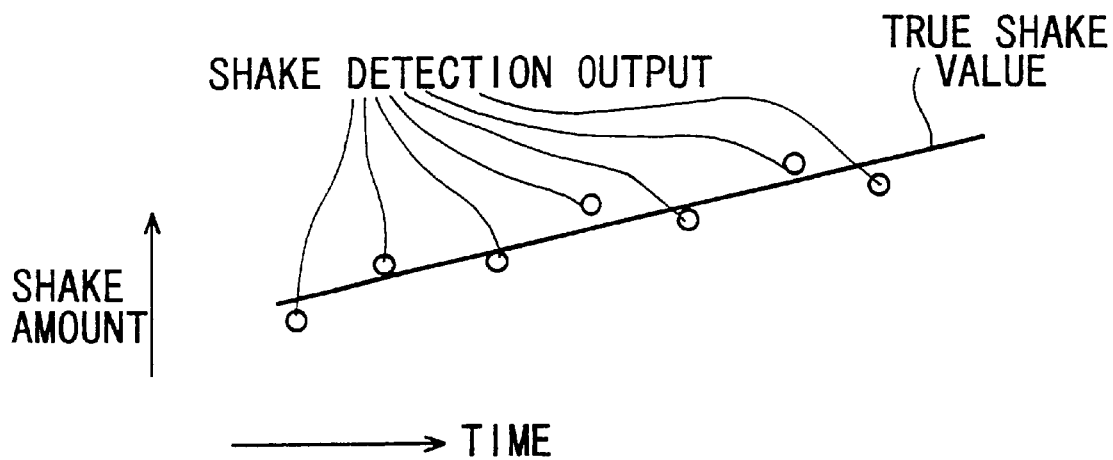

FIGS. 6A and 6B are diagrams showing a variation in the shake detection output relative to a true shake value represented by the solid straight line. FIG. 6A shows a state that the shake detection output is affected by a structural failure such as an attachment displacement of the shake sensor 42. FIG. 6B shows a state that the shake detection output is not affected by the structural failure.

In FIG. 6A, all the shake detection outputs are above the true shake line and appear in an unbalanced state. It is often the case that this kind of unbalanced output is affected by a structural failure such as an attachment displacement of the shake sensor 42.

On the other hand, in FIG. 6B, the shake detection outputs alternately are above and below the true shake line while interposing the true shake value line therebetween. This balanced shake detection output represents that the detection output is not affected by the structural failure, and accordingly, it can be evaluated that a shake detection precision is high.

Figure 7A:
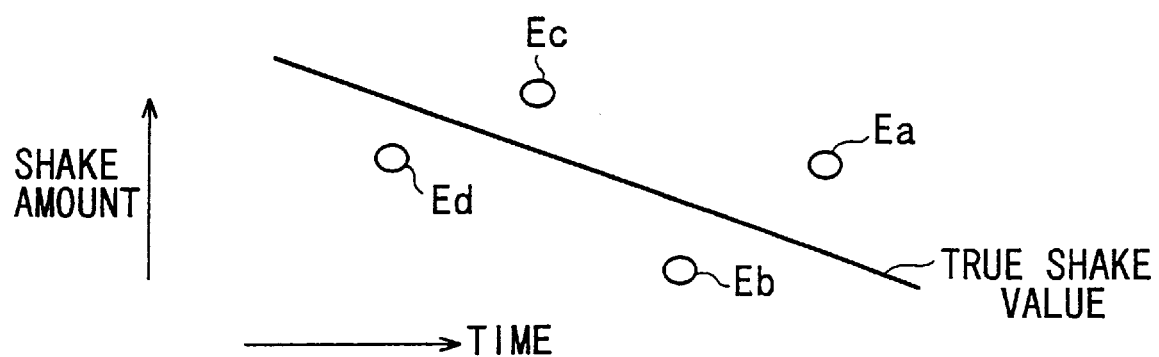
FIGS. 7A and 7B are diagrams of extracted shake amount data relative to the true shake value, FIG. 7A showing a state that a shake detection output varies greatly, and FIG. 7B showing a state that the shake detection output varies moderately.
Figure 7B:
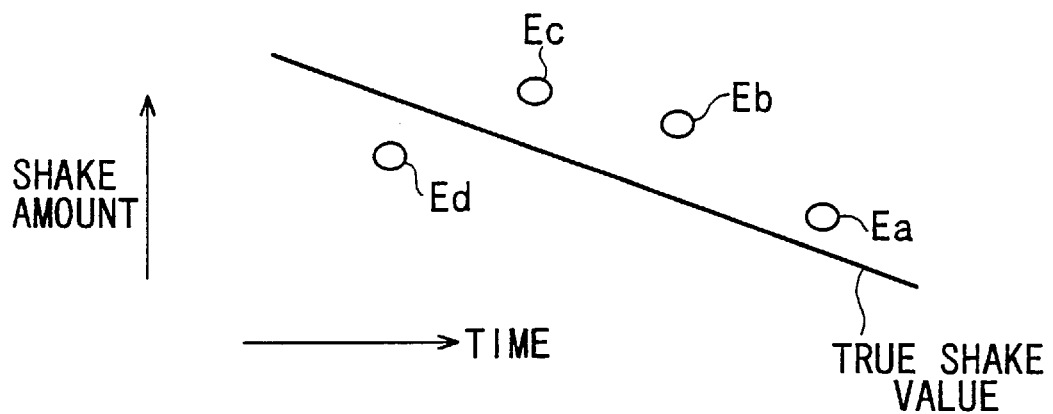

FIGS. 7A and 7B are diagrams showing shake detection outputs relative to the true shake line. FIG. 7A shows a state that the shake detection output varies greatly, and FIG. 7B shows a state that the shake detection output varies moderately. It should be appreciated that the time between extraction of the shake amount data Ea and Ed is 30 ms at the most under the data extraction based on the reference time spaces as mentioned above.

As shown in FIG. 7A, if the shake detection outputs vary up and down within a very short period, e.g., 30 ms, the frequency of variation is higher than 10 Hz, beyond an upper limit of shake amount due to a camera shake. In such a case, it could be considered that this shake detection output includes a factor other than the camera shake.

The shake detection in this embodiment is based on processed image data. Accordingly, in the case of low luminance, there may be likely to occur the shake detection output variation which is similar to FIG. 7A, which consequently provides a low shake detection precision. On the other hand, in the case of sufficient luminance, a reliable shake detection precision is obtainable, and its shake detection output variation will accordingly come into a state similar to FIG. 7B where the variation in the shake detection output is small.

In this embodiment, the shake detection precision about the shake amount data Ea to Ed is represented by a variation in the shake acceleration. Alternatively, the shake detection precision may be represented by a variation in the shake speed.

A shake acceleration variation C is calculated in accordance with Equation (5) based on a shake acceleration rate obtained from the shake amount data Ea, Eb, Ec, and a shake acceleration rate obtained from the shake amount data Eb, Ec, Ed, since at least three shake amount data are required to calculate the shake acceleration rate α.

$$\begin{aligned}C &= \left\{\frac{Ea-Eb}{ta-tb} - \frac{Eb-Ec}{tb-tc}\right\} - \left\{\frac{Eb-Ec}{tb-tc} - \frac{Ec-Ed}{tc-td}\right\} \quad \text{[Equation 5]}\\ &= \frac{Ea - 3\times Eb + 3\times Ec - Ed}{T1'}\\ &= Ea - 3\times Eb + 3\times Ec - Ed\end{aligned}$$

Since the integration time for each image signal to obtain the shake amount data Ea to Ed can be regarded equal to each other, the times (ta–tb), (tb–tc), (tc–td) are set equal to a common period, namely, an integration period T1'. The purpose of executing Equation (5) is to express a variation in the shake detection output, and there is no need of calculating an accurate shake acceleration variation C. Accordingly, the integration period T1' is set to T1'=1 to ensure quick calculation.

The above calculation in accordance with Equation (5) is executed for a certain number of times (preferably 20 times). These shake acceleration variations are added for summation. However, the shake acceleration variation C has the direction which is expressed by plus (+) or minus (−). Accordingly, shake acceleration variations C are squared, and the squares are added for summation.

The shake acceleration variation C is calculated in the horizontal and vertical directions. Accordingly, the summation of the squared variations is calculated in the horizontal and vertical directions as: $SumC_H = SumC_H + C_H$, $SumC_V = SumC_V + C_V$ where $C_H$ is a squared shake acceleration variation in the horizontal direction and $C_V$ is a squared shake acceleration variation in the vertical direction.

In the last stage, the shake detection precision value of the shake detecting unit 4 is obtained by adding the summation of shake acceleration variations in the horizontal direction and the summation of shake acceleration variations in the vertical direction and dividing the sum by two.

The calculation in accordance with Equation (5) is executed an appropriate number of times to evaluate the shake detection precision. It may be preferable to execute 20 times from the viewpoint of quick computation (if the computation is slow, time for executing shake correction becomes insufficient) and statistical reliability.

In this embodiment, the sum of shake acceleration variation C is obtained by squaring each of shake acceleration variations C in the horizontal and vertical directions and adding squared shake acceleration variations in the horizontal and vertical directions. Alternatively, it may be appreciated to obtain the sum of absolute values of shake acceleration variations C.

In this embodiment, the shake detection precision is evaluated on the basis of an average of the sum of shake acceleration variations in the horizontal and vertical directions. As an altered form, either the sum of shake acceleration variations in the horizontal direction or the sum of shake acceleration variations in the vertical directions may be used, or the larger one of them may be used.

Alternatively, the shake detection precision may be evaluated in the horizontal and vertical directions individually. However, the individual evaluation increases the time for data extraction twice.

Referring back to FIG. 4, the detection precision evaluator 514b evaluates or judges whether the shake detection precision is high using a predetermined evaluation reference value. The evaluation reference value is obtained by assuming that the detection output in connection with a camera shake have the form of a sinusoidal wave or its equivalent. In this embodiment, the evaluation reference value used in the detection precision evaluator 514b is obtained in advance by executing a simulative shake detection.

More specifically, if the shake detection precision value (σ in FIGS. 9, 10A, 10B) calculated by the detection precision calculator 514a is smaller than the predetermined evaluation reference value, the detection precision evaluator 514b judges that the shake detection precision is high, namely, detection outputs are reliable. On the other hand, if the shake detection precision value is larger than the evaluation reference value, the detection precision evaluator 514b judges that the shake detection precision is low, namely, detection outputs are not reliable. An evaluation flag $F_B$ indicative of an evaluation result by the detection precision evaluator 514b is set at "1" when the calculated variation is larger than the evaluation reference value, and the evaluation flag $F_B$ is set at "0" when the calculated variation is smaller than the evaluation reference value.

The parameter setter 514c sets the parameters Tv, Tα to be set in the data extractor 512 and the parameter k to be set in the estimative shake amount calculator 513 in accordance with an evaluation result outputted from the detection precision evaluator 514. Hereinafter, the parameters Tv, Tα, k to be set when the evaluation result is good are referred to as "first parameters Tv1, Tα1, k1", while the parameters Tv, Tα, k to be set when the evaluation result is not good are referred to as "second parameters Tv2, Tα2, k2". The respective parameters are set such that the first parameters Tv1, Tα1 are smaller than the second parameters Tv2, Tα2, respectively and the first parameter k1 is set equal to or larger than the second parameter k2.

More specifically, the parameter setter 514c sets the first parameters when the evaluation flag $F_B$ is set at "0" and the estimative calculation allowance flag $F_P$ is set at "1" while setting the second parameters when the evaluation flag $F_B$ is set at "1" or the estimative calculation allowance flag $F_P$ is set at "0".

Figure 8A:
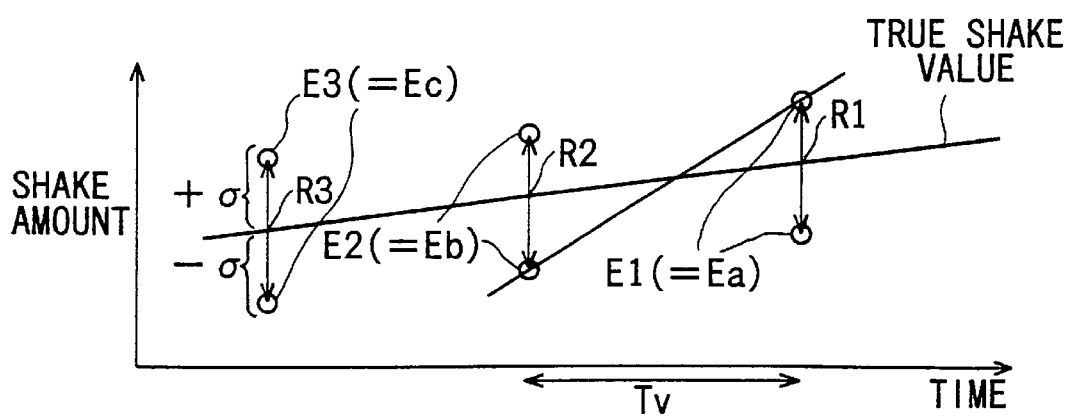
FIGS. 8A and 8B are diagrams of extracted shake amount data including a variation of ±σ relative to the true shake value, FIG. 8A showing a state that the shake amount data are extracted using a first parameter, FIG. 8B showing a state that the shake amount data are extracted using a second parameter.
Figure 8B:
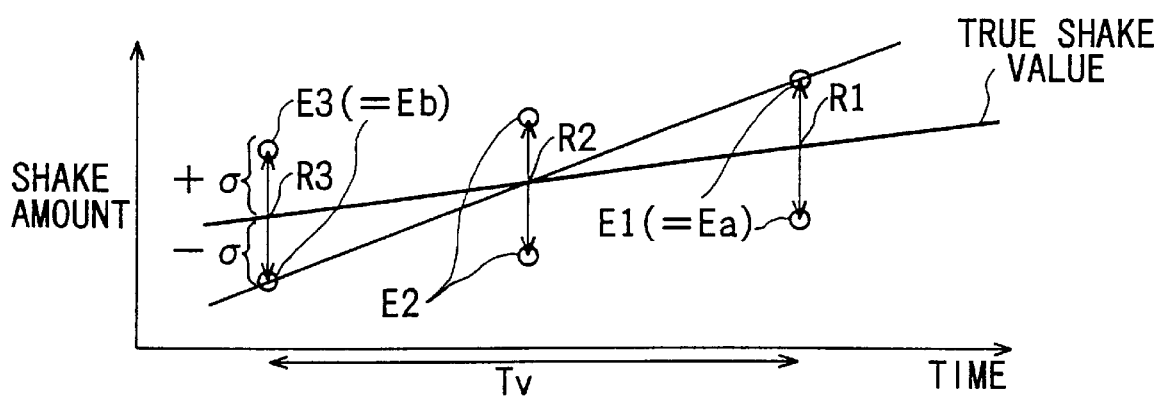

FIGS. 8A and 8B are diagrams of extracted shake amount data including a variation of ±σ relative to the true shake value. FIG. 8A shows a state that the shake amount data are extracted using the first parameter Tv1. FIG. 8B shows a state that the shake amount data are extracted using the second parameter Tv2. It should be noted that R1, R2, R3 respectively denote true shake values (true shake amounts) corresponding to shake amount data E1, E2, E3.

In FIGS. 8A and 8B, a shake speed Vba including a maximum variation (detection error) is obtained by executing Equation (6).

$$Vba = \frac{(R1 + \sigma) - (R2 - \sigma)}{Tv} \quad \text{[Equation 6]}$$
$$= \frac{R1 - R2}{Tv} + \frac{2 \times \sigma}{Tv}$$

In Equation (6), the term (2×σ/Tv) indicates a detection error added to a true shake speed ((R1−R2)/Tv). In FIG. 8A, the first parameter Tv1 is used as the parameter, and a detection error is 2×σ/Tv1. In FIG. 8B, the second parameter Tv2 is used as the parameter, and a detection error is 2×σ/Tv2. Since the relationship between the first parameter Tv1 and the second parameter Tv2 is Tv1<Tv2, a relationship of the detection error in FIG. 8A and the detection error in FIG. 8B is 2×σ/Tv1>2×σ/Tv2. According to this expression, it can be understood that setting the second parameter Tv2 as the parameter Tv suppresses a detection error when the variation σ is large.

As mentioned above, the second parameters Tv2, Tα2 are set when the variation α is larger than the evaluation reference value in this embodiment. Further, when the evaluation result is not good, the third term of Equation (4) representing the shake acceleration rate is low in the precision evaluation. Accordingly, the second parameter k2 smaller than the first parameter k1 is set when the variation σ is larger than the evaluation reference value.

On the other hand, when the evaluation result is good, the first parameters Tv1, Tα1 are used as the parameters. In other words, using the shake amount data extracted at a time nearest or nearer to the current time maintains the shake correction precision at a high level. Further, when the evaluation result is good, the third term of Equation (4) representing the shake acceleration rate is high in the precision evaluation. Accordingly, in this case, the first parameter k1 larger than the second parameter k2 is used to allow variation in the shake acceleration rate to be affected on the estimative shake amount calculation.

FIG. 9 is a graph showing a simulation result when evaluating a shake correction precision using the first parameter and the second parameter. In a simulative shake detection, the actual shake amounts due to a camera shake is assumed to have the form of a sinusoidal wave. In FIG. 9, a first curve represents a gap (correction remainder) between an actual shake amount and an estimative shake amount when the first parameter is used. Similarly, a second curve represents a gap (correction remainder) between an actual shake amount and an estimative shake amount when the second parameter is used.

It can be understood from FIG. 9 that using the first curve (i.e., using the first parameter) attains a more precise correction when the shake detection precision value (variation σ) is smaller than the evaluation reference value. On the other hand, usingthe second curve (i.e., using the second parameter) attains a more precise correction when the shake detection precision value (variation σ) is larger than the evaluation reference value.

Figure 10A:
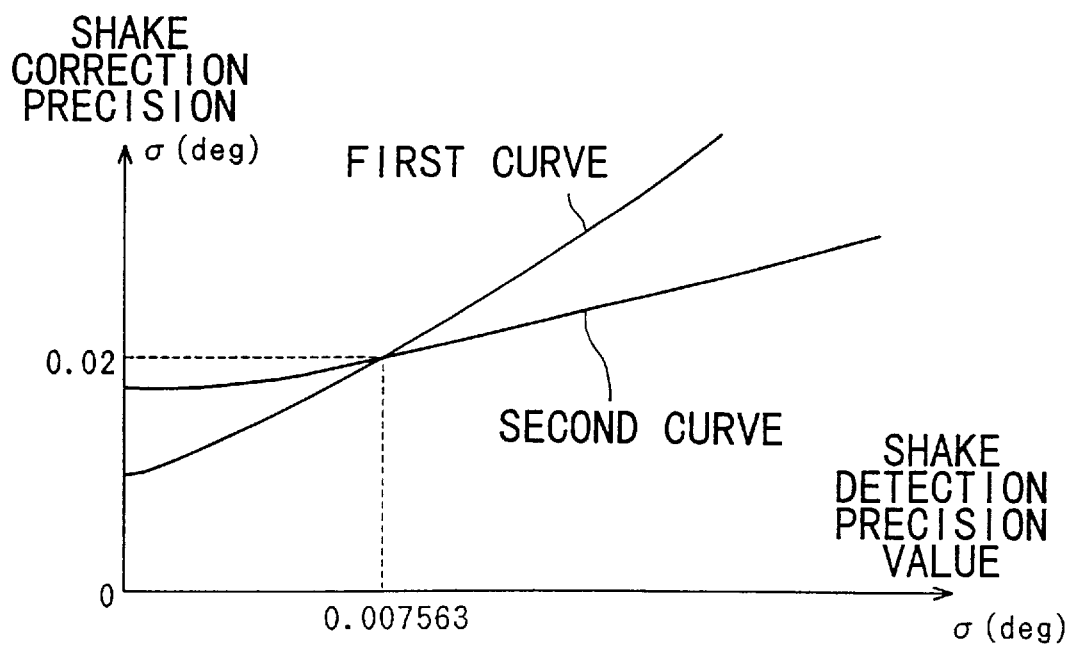
FIGS. 10A and 10B are diagrams respectively showing simulation results when different evaluation reference values are used, FIG. 10A showing a state that a shake acceleration variation is used as the evaluation reference value, and FIG. 10B showing a state that a shake speed variation is used as the evaluation reference value.
Figure 10B:
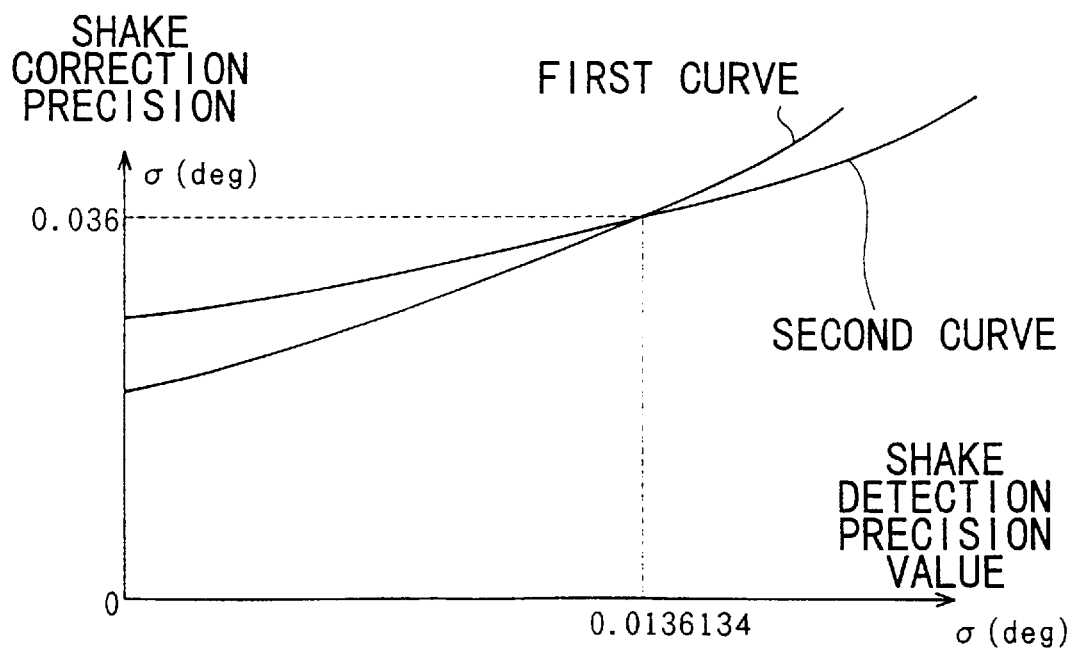

FIGS. 10A and 10B are diagrams respectively showing simulation results when different evaluation reference values are used. FIG. 10A shows a state that a shake acceleration variation is used as the shake detection precision value, and FIG. 10B shows a state that a shake speed variation is used as the shake detection precision value.

In FIG. 10A, using the first parameter attains a high detection precision when the variation is smaller than 0.007563 [deg], and using the second parameter attains a high detection precision when the variation is larger than 0.007563 [deg].

As mentioned above, in this embodiment, the shake detection precision value is calculated based on a shake acceleration variation. Alternatively, the shake detection precision value may be calculated based on a shake speed variation.

Referring back to FIG. 1, the data converter 52 converts estimative shake amount data with respect to the horizontal and vertical directions into target angular position data with respect to the horizontal and vertical directions for the correction lens unit 3 using a conversion coefficient stored in the memory 56. This converter 52 also calculates a correction coefficient based on the ambient temperature detected by the temperature sensor 55 and corrects the target angular position data using this correction coefficient. This correction coefficient is used to correct variations in the focal length of the detection lens 41 caused by a change in the ambient temperature and the refractive index of the correction lens.

The target position setter 53 converts the corrected target angular position data into target position information concerning target positions into which the horizontal shake correction lens 31 and the vertical shake correction lens 32 are moved. These target positions in the horizontal and vertical directions are set in the driving unit 6 as control data $SD_{PH}$, $SD_{PV}$.

The target position setter 53 sets the control data $SD_{PH}$, $SD_{PV}$ which have been set immediately before detection of a low contrast state in the driving unit 6 in the case where the number of shake amount calculations by the actual shake amount calculator 511 is less than the estimative calculation number $N_P$ when the flag $F_L$ is set at "1". The horizontal correction lens 31 and the vertical correction lens 32 are respectively stopped at the instant positions before detection of the low contrast state.

The correction gain setter 54 calculates gain correction amounts in the horizontal and vertical directions based on the ambient temperature detected by the temperature sensor 55, and set them in the driving unit 6 as control data $SD_{GH}$, $SD_{GV}$. The gain correction amounts in the horizontal and vertical directions are adapted to correct basic gains in the horizontal and vertical directions in the driving unit 6. The basic gains and the control data $SD_{GH}$, $SD_{GV}$ are described later in detail.

The position data input device 57 obtains the respective positions of the horizontal and vertical shake correction lenses 31, 32 by A/D converting the respective output signals of the position detector 7. An anomalous state of the lens driving system of the correction lens unit 3 is found by checking the positions of the shake correction lenses.

Next, a construction of the driving unit 6 is described. The driving unit 6 includes a drive control circuit 61, a horizontal actuator 62, and a vertical actuator 63. The drive control circuit 61 generates horizontal and vertical drive signals based on the control data $SD_{PH}$, $SD_{PV}$, $SD_{GH}$, $SD_{GV}$ from the target position setter 53 and the correction gain setter 54. The horizontal and vertical actuators 62, 63 each include a coreless motor or the like (see the motor 632 and the pinion gear 631 in FIG. 2) and drive the horizontal and vertical shake correction lenses 31, 32 in accordance with the horizontal and vertical drive signals generated by the drive control circuit 61.

Figure 11:
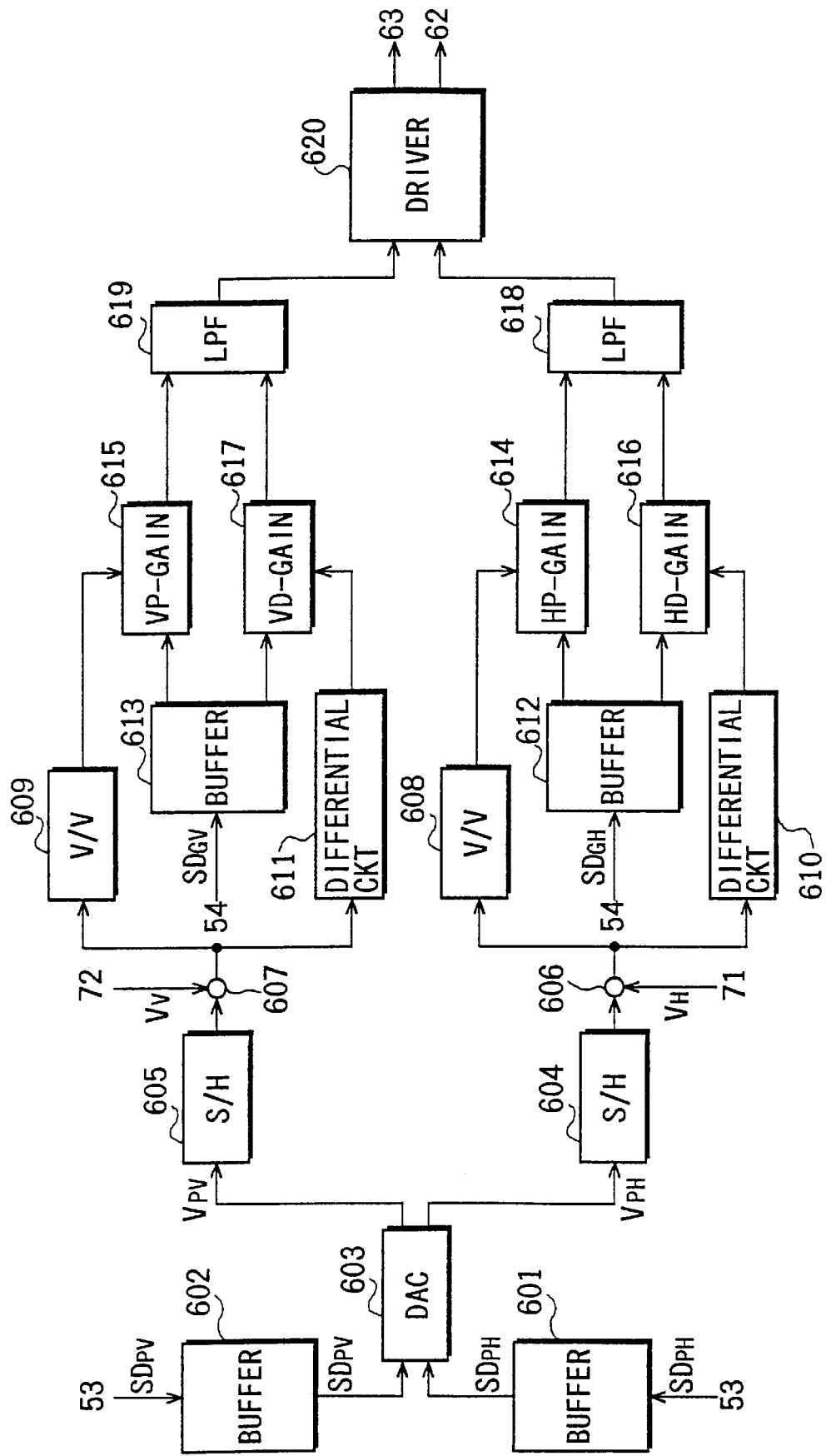
FIG. 11 is a block diagram showing an example of a drive control circuit constituting a part of a servo control system provided in the camera.

Next, the drive control circuit 61 of the driving unit 6 is described with reference to FIG. 11. FIG. 11 is a block diagram showing a construction of the drive control circuit 61 constituting part of a servo control system. First, the data $SD_{GH}$, $SD_{GV}$ set in the drive control circuit 61 are described. In the camera 1, a variation occurs in the driving performance of the lens driving system when the ambient temperature changes. For example, as the ambient temperature changes, the torque ratios of the motors (e.g., the motor 632 shown in FIG. 2), the backlash of the lens driving system of the correction lens unit 3 and the driving unit 6, and the hardness of the gears (e.g., rack gear 322 and the pinion gear 631 in FIG. 2) of the lens driving system change.

Figure 12:
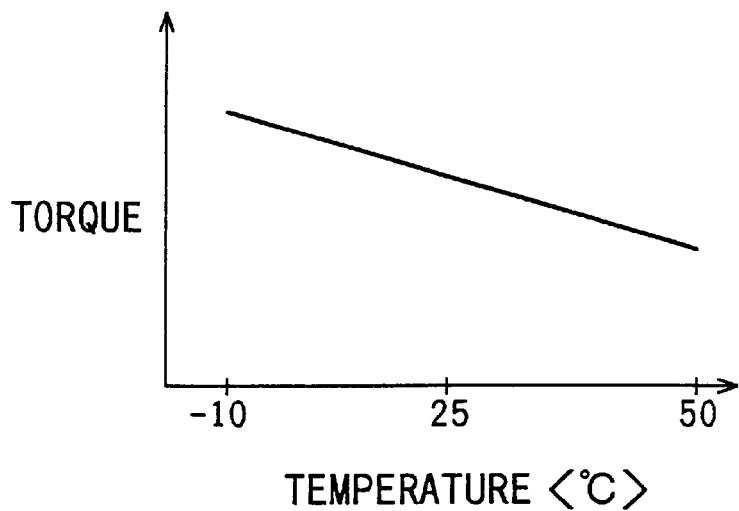
FIG. 12 is a graph showing a temperature characteristic of a drive motor provided in the camera, affecting the lens driving performance.

FIG. 12 is a graph showing a change in the driving performance (torque) of the motor with a temperature variation. As can be understood from FIG. 12, when the ambient temperature becomes different from a reference temperature (e.g., 25° C.), the motor torque changes from a value at the reference temperature. As a result, the driving performance of the lens driving system changes. In other words, the driving performance based on the basic gain of the horizontal and vertical direction (drive gains at the reference temperature) changes as the ambient temperature detected by the temperature sensor 55 changes from the reference temperature.

Accordingly, the correction gain setter 54 is so constructed as to generate gain correction data for correcting a variation in the driving performance based on the basic gain of horizontal and vertical direction in accordance with an ambient temperature detected by the temperature sensor 55. In this embodiment, there are provided functions to obtain gain correction data for individually compensating for variations in the motor torque, backlash and gears with a change in the ambient temperature from the reference temperature. The ambient temperatures detected by the temperature sensor 55 are put in the respective correction functions with respect to horizontal and vertical directions, and a sum of calculated values is obtained as a gain correction amount. The gain correction amounts with respect to horizontal and vertical directions are set in the drive control circuit 61 as the control data $SD_{GH}$, $SD_{GV}$.

Next, the drive control circuit 61 is described. Although the control data $SD_{GH}$, $SD_{GV}$ are shown to be transmitted via two signal lines in FIG. 1 to simplify the drawing, they are actually sent by serial transmission via unillustrated two data lines (SCK, SD) and three control lines (CS, DA/GAIN, X/Y). Similarly, the control data $SD_{PH}$, $SD_{PV}$ are alternately transmitted to the drive control circuit 61.

The drive control circuit 61 includes buffers and sample-and-hold circuits. In other words, buffers 601, 602 in FIG. 11 are memories for storing the data $SD_{PH}$, $SD_{PV}$ alternately set by the target position setter 53.

A digital-to-analog converter (DAC) 603 converts the control data $SD_{PH}$ in the buffer 601 and the control data $SD_{PV}$ in the buffer 602 into a target position voltage $V_{PH}$ and a target position voltage $V_{PV}$, respectively. A sample-and-hold (S/H) circuit 604 samples the target position voltage $V_{PH}$ converted by the DAC 603 and holds this value till a next sampling. Likewise, a S/H circuit 605 samples the target position voltage $V_{PV}$ converted by the DAC 603 and holds this value till a next sampling.

An adder circuit 606 calculates a difference between the target position voltage $V_{PH}$ and an output voltage $V_H$ of the horizontal position detector 71. An adder circuit 607 calculates a difference between the target position voltage $V_{PV}$ and an output voltage $V_V$ of the vertical position detector 72. In other words, the adder circuits 606, 607 obtain voltage differences by addition since the output voltages $V_H$, $V_V$ are obtained as negative voltages in the horizontal and vertical position detectors 71, 72.

Identified by V/V 608 is an amplifier for amplifying an input voltage to a voltage as a horizontal direction proportional gain at a ratio set in advance for the reference temperature. Identified by V/V 609 is an amplifier for amplifying an input voltage to a voltage as a vertical direction proportional gain at a ratio set in advance for the reference temperature. Here, the horizontal direction proportional gain is a gain proportional to a difference between the target position of the horizontal shake correction lens 31 and the position of the horizontal shake correction lens 31 detected by the horizontal position detector 71. Further, the vertical direction proportional gain is a gain proportional to a difference between the target position of the vertical shake correction lens 32 and the position of the vertical shake correction lens 32 detected by the vertical position detector 72.

A differential circuit 610 multiplies the voltage difference obtained by the adder circuit 606 by a differential by a time constant set in advance for the reference temperature to obtain a voltage as a horizontal direction differential gain. The thus obtained voltage corresponds to a horizontal direction speed difference (a difference between a target driving speed and a present driving speed). Similarly, a differential circuit 611 multiplies the voltage difference obtained by the adder circuit 607 by a differential by a time constant set in advance for the reference temperature to obtain a voltage as a vertical direction differential gain. The thus obtained voltage corresponds to a vertical direction speed difference (a difference between a target driving speed and a present driving speed).

In this way, the proportional and differential gains as the basic gains corresponding to the reference temperature are set with respect to horizontal and vertical directions by the amplifiers 608, 609 and the differential circuits 610, 611.

A buffer 612 is a memory for storing the control data $SD_{GH}$ of the correction gain setter 54. The control data $SD_{GH}$ is gain correction amounts (proportional and differential gain correction amounts) for correcting the horizontal direction basic gain (proportional and differential gains). A buffer 613 is a memory for storing the control data $SD_{GV}$ of the correction gain setter 54. The control data $SD_{GV}$ is gain correction amounts (proportional and differential gain correction amounts) for correcting the vertical direction basic gain (proportional and differential gains).

A HP gain correcting circuit 614 outputs a horizontal direction proportional gain after a temperature correction by adding an analog voltage corresponding to the horizontal direction proportional gain correction amount from the buffer 612 to the horizontal direction proportional gain obtained in the amplifier 608. Further, a VP gain correcting circuit 615 outputs a vertical direction proportional gain after the temperature correction by adding an analog voltage corresponding to the vertical direction proportional gain correction amount from the buffer 613 to the vertical direction proportional gain obtained in the amplifier 609.

A HD gain correcting circuit 616 outputs a horizontal direction differential gain after the temperature correction by adding an analog voltage corresponding to the horizontal direction differential gain correction amount from the buffer 612 to the horizontal direction differential gain obtained in the differential circuit 610. Further, a VD gain correcting circuit 617 outputs a vertical direction differential gain after the temperature correction by adding an analog voltage corresponding to the vertical direction differential gain correction amount from the buffer 613 to the vertical direction differential gain obtained in the differential circuit 611.

In this way, the proportional and differential gains as the basic gains are corrected according to temperature by the HP, VP, HD and VD gain correcting circuits 614, 615, 616 and 617.

A low pass filter (LPF) 618 removes high frequency noises included in the respective output voltages of the HP and HD gain correcting circuits 614, 616. A low pass filter (LPF) 619 removes high frequency noises included in the respective output voltages of the VP and VD gain correcting circuits 615, 617.

A driver 620 is an IC for the driving of the motor which supplies drive voltages corresponding to the output voltages of the LPFs 618, 619 to the horizontal and vertical actuators 62, 63, respectively.

The position detecting unit 7 shown in FIG. 1 includes the horizontal and vertical position detectors 71, 72, which are adapted to detect the present or current positions of the horizontal and vertical shake correction lenses 31, 32, respectively.

Figure 13:
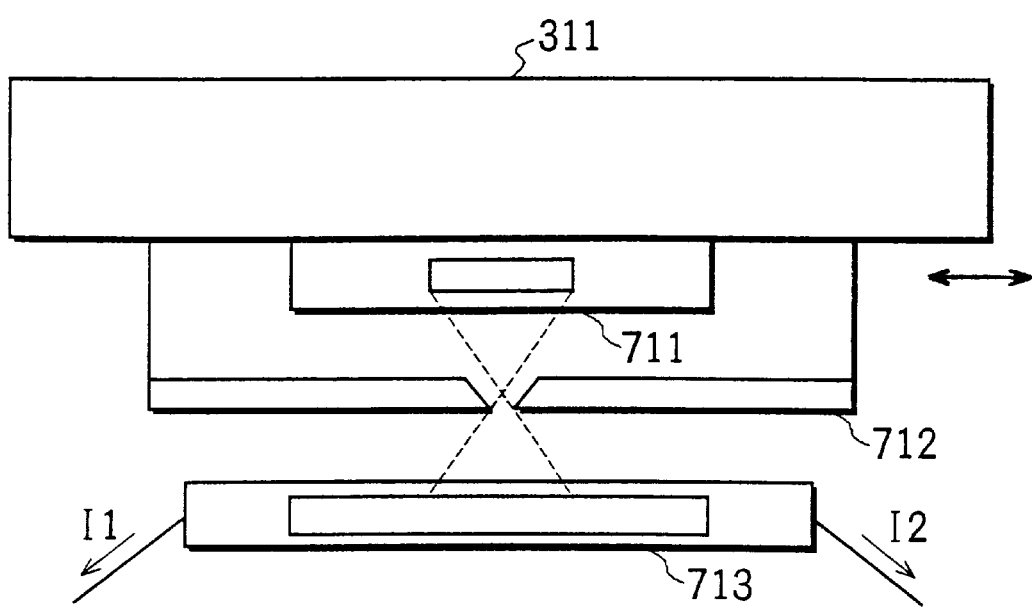
FIG. 13 is a schematic diagram of a horizontal position detector.

FIG. 13 is a schematic diagram of the horizontal position detector 71. The horizontal position detector 71 includes an LED (light-emitting diode) 711, a cover member 712 having a slit and a PSD (position sensing device) 713. The LED 711 is mounted in a position of the frame 311 of the horizontal shake correction lens 31 where the gear portion 312 is formed, and the cover member 712 having the slit is adapted to sharpen the directivity of the light emitted from a light emitting portion of the LED 711. The PSD 713 is mounted in a position of the inner wall of the lens barrel 24 of the camera main body opposite to the LED 711. This PSD 713 outputs photoelectrically converted currents I1, I2 of values corresponding to a light sensing position (center of gravity position) of the beams emitted from the LED 711. The position of the horizontal shake correction lens 31 is detected by measuring a difference between the photoelectrically converted currents I1 and I2. The vertical position detector 72 is similarly constructed so as to detect the position of the vertical shake correction lens 32.

Figure 14:
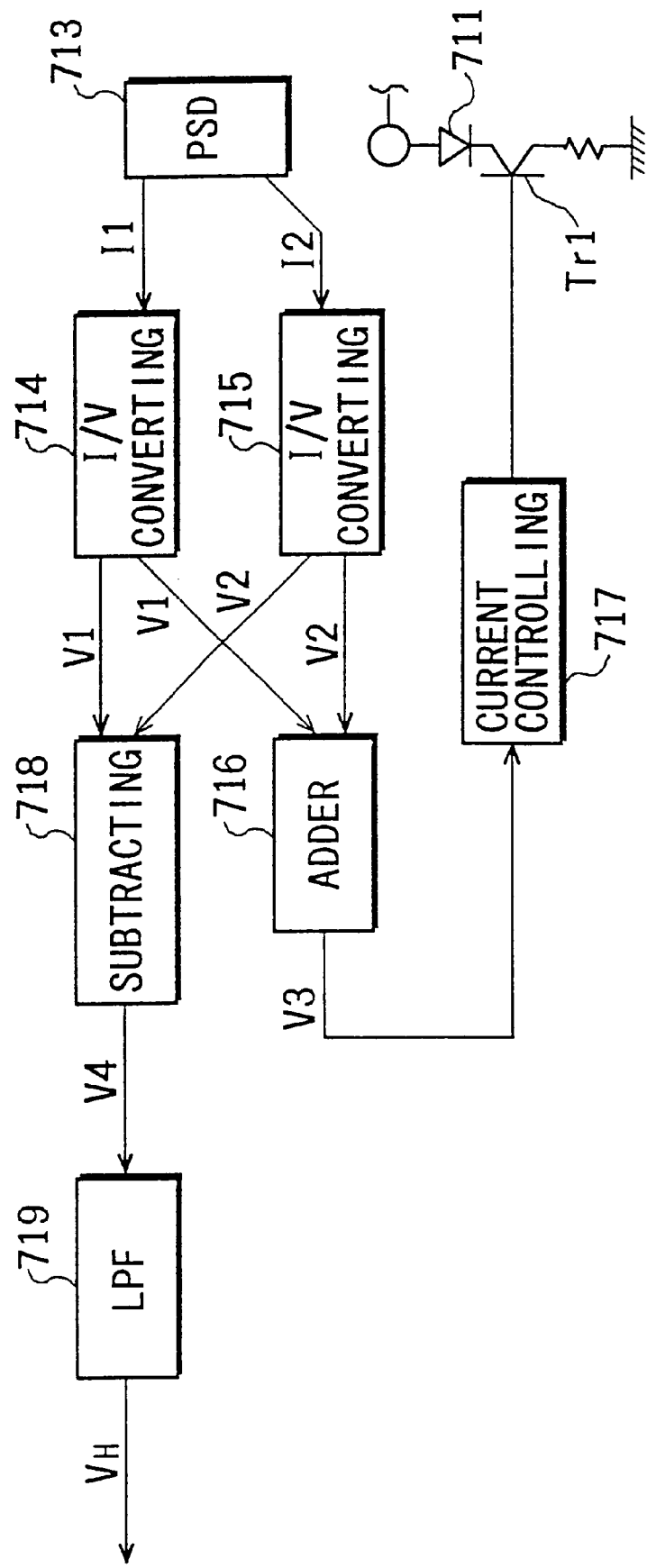
FIG. 14 is a block diagram of the horizontal position detector.

FIG. 14 is a block diagram of the horizontal position detector 71. In addition to the LED 711 and the PSD 713, the horizontal position detector 71 includes current-to-voltage (I/V) converting circuits 714, 715, an adder circuit 716, a current controlling circuit 717, a subtracting circuit 718, a low pass filter (LPF) 719, and the like. The I/V converting circuits 714, 715 respectively convert the output currents I1, I2 of the PSD 713 into voltages V1, V2. The adder circuit 716 calculates a sum voltage V3 of the output voltages V1, V2 of the I/V converting circuits 714, 715. The current controlling circuit 717 increases and decreases a base current to a transistor Tr1 so as to hold the output voltage V3 of the adder circuit 716, i.e., the amount of light emitted from the LED 711 constant. The subtracting circuit 718 calculates a difference voltage V4 of the output voltages V1, V2 of the I/V converting circuits 714, 715. The LPF 719 removes high frequency components included in the output voltage V4 of the subtracting circuit 718.

Next, the detection by the horizontal position detector 71 is described. The currents I1, I2 from the PSD 713 are converted into the voltages V1, V2 in the I/V converting circuits 714, 715, respectively. Subsequently, the voltages V1, V2 are added in the adder circuit 716. The voltage control circuit 717 supplies a voltage which makes the voltage V3 obtained by the addition always constant to the base of the transistor Tr1. The LED 711 emits light at an amount corresponding to this base current.

On the other hand, the voltages V1, V2 are subtracted in the subtracting circuit 718. The voltage V4 obtained by this subtraction is a value representing the position of the horizontal shake correction lens 31. For example, in the case that the light sensing position (center of gravity) is away to the right from the center of the PSD 713 by a length x, the length x, the currents I1, I2 and a length L of a light sensing area of the PSD 713 satisfy a relationship defined by Equation (7).

$$\frac{I2 - I1}{I2 + I1} = \frac{2 \cdot x}{L} \quad \text{[Equation 7]}$$

Similarly, the length x, the voltages V1, V2 and the length L of the light sensing area satisfy a relationship defined by Equation (8).

$$\frac{V2 - V1}{V2 + V1} = \frac{2 \cdot x}{L} \quad \text{[Equation 8]}$$

If a control is performed so as to make a value of V1+V2, i.e., a value of the voltage V3 always constant, there can be obtained a relationship defined by Equation (9), in which a value of V2−V1, i.e., a value of the voltage V4 represents the length x. Accordingly, the position of the horizontal shake correction lens 31 can be detected if the voltage V4 is monitored.

$$V2-V1 \propto x \quad \text{[Equation 9]}$$

Referring back to FIG. 1, the exposure controlling unit 8 is described. The exposure controlling unit 8 comprises a light metering device 81 and an exposure setter 82. The light metering device 81 includes a photoelectric conversion element, e.g., Silicon Photo Cell (SPC), for receiving light reflected from an object to detect a luminance of the object. The exposure setter 82 sets an optimum exposure time $t_{SS}$ in accordance with a detected luminance of the object. The shutter 23 is opened and closed by an unillustrated shutter control device. Upon lapse of the optimum exposure time $t_{SS}$, the shutter 23 is closed.

The shutter release monitoring unit 9 judges whether a switch S1 is turned on when a shutter release button is half-way pressed, and judges whether a switch S2 is turned on when the shutter release button is fully pressed. When the switch S1 is turned on, a sequence implementing a photographing preparatory operation starts, and when the switch S2 is turned on, a sequence implementing a photographing operation starts.

The distance metering module 10 is of an active metering type, and comprises an LED for emitting light of infrared rays and a one-dimensional PSD for receiving light of the LED reflected from an object, and is adapted to meter an object distance based on the light receiving position of the PSD. The distance metering module 10 is not limited to one of the active metering type. A passive metering method may be adopted which uses a pair of line sensors for sensing light from an object. A passive metering module is so constructed that line sensors individually sense an object light image to obtain distance data corresponding to an object distance based on a difference between light images sensed by the pair of line sensors.

A focusing unit 11 calculates a defocused amount (displaced amount of an object image from a focusing position) based on a detected distance data from the distance metering module 10 to drive the taking lens 21 to the focusing position based on the defocused amount.

The shake display unit 12 includes an LED segment provided in a viewfinder and displays a displaced state of the object image based on a shake amount outputted from the shake data processor 51. Thereby, the instant shake amount is recognizable to a viewer. The shake display unit 12 may directly display the shake amount outputted from the shake data processor 51.

In this embodiment, the exposure setter 82, the shutter release monitoring unit 9, and the focusing unit 11 (focus controller) constitute a microprocessor $\mu C1$ which implements a sequence in which a general operation of the camera 1 except a shake correction is performed. Further, the shake sensor controller 43, the signal processor 44, the shake amount detector 51, the coefficient converter 52, the target position setter 53, the correction gain setter 54, and the position data input device 57 constitute a microprocessor $\mu C2$ which implements a sequence in which an operation of shake correction is executed.

Figure 15:
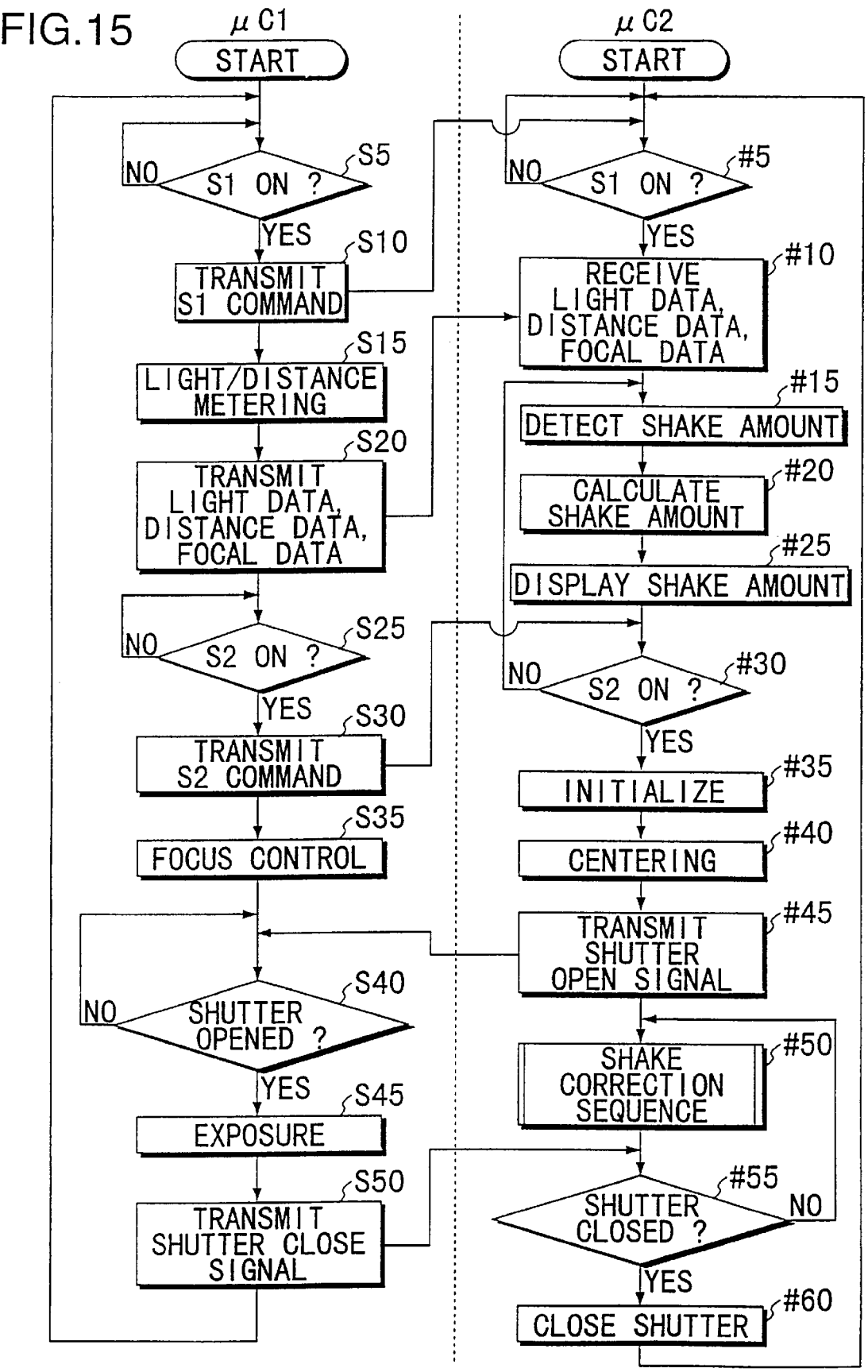
FIG. 15 is a flowchart showing control sequences respectively implemented by microprocessors in the camera.

Next, an operation of the camera 1 is described. FIG. 15 is a flowchart of a control sequence executed by the microprocessors $\mu C1$, $\mu C2$. When an unillustrated main switch of the camera 1 is turned on, the microprocessor $\mu C1$ activates the microprocessor $\mu C2$ and judges whether the switch S1 is turned on (in Step S5). This judgement is repeated until the switch S1 is turned on (YES in Step S5).

When the switch S1 is turned on (YES in Step S5), a S1 command signal indicative of the turn on of the switch S1 is transmitted to the microprocessor $\mu C2$ (in Step S10).

A luminance of an object image is detected to generate object luminance data, and an object distance is metered to generate object distance data (in Step S15). Focal distance data is calculated, and the object luminance data (light data), the object distance data, and the focal distance data are transmitted to the microprocessor $\mu C2$ (in Step S20).

On the side of the microprocessor $\mu C2$, it is judged whether the switch S1 is turned on based on a judgement as to whether the S1 command signal is transmitted (in Step #5). This judgement is repeated until the switch S1 is turned on, in other word, until receiving the S1 command signal (YES in Step #5).

When it is judged that the switch S1 is turned on (YES in Step #5), the microprocessor $\mu C2$ receives the object luminance data, the object distance data, and the focal distance data (in Step #10). Subsequently, an object light image is picked up for a shake detection (in Step #15), and a shake amount is calculated in accordance with a shake amount calculation based on the picked up object light image (in Step #20). The shake display unit 12 displays a state of image displacement in terms of shake amount (in Step #25).

Referring back to the microprocessor $\mu C1$, after the data transmission in Step S20, it is judged whether the switch S2 is turned on (in Step S25). This judgement is repeated until the switch S2 is turned on (YES in Step S25). When the switch S2 is turned on (YES in Step S25), a S2 command signal indicative of the turn on of the switch S2 is transmitted to the microprocessor $\mu C2$ (in Step S30). Subsequently, the taking lens 21 is moved toward the focal position in accordance with the object distance data calculated in Step S15 (in Step S35).

On the side of the microprocessor $\mu C2$, after the shake amount display in Step #25, it is judged whether the switch S2 is turned on based on a judgement as to whether the S2 command signal is transmitted (in Step #30). When it is judged that the switch S2 is not turned on (NO in Step #30), the sequence returns to Step #15. Thereafter, the shake detection, the shake amount calculation, and the shake amount display are repeated (the loop of Steps #15 to #25) until it is judged that the switch S2 is turned on in Step #30.

When it is judged that the switch S2 is turned on (YES in Step #30), the camera 1 is set in an initial state (in Step #35). For instance, the low contrast flag $F_L$ and a counter "i" are set at "0", and the evaluation flag $F_B$ and the allowance flag $F_P$ are set at "1" at the initialization. Subsequently, the horizontal correction lens 31 and the vertical correction lens 32 of the correction lens unit 3 are driven to the respective center positions (in Step #40), and a shutter open command signal is transmitted to the microprocessor μC1 after completion of the focus control in Step S35 (in Step #45).

Alternatively, a certain stand-by period may be set, e.g., at the beginning of the initialization of the camera 1 to ensure transmission of the shutter open command signal to the microprocessor μC1 after completion of the focus control in Step S35. In this case, a maximum time required for focus control may be calculated in advance and the stand-by period may be set such that the time required in Steps #35, #40 is longer than the maximum time. Consequently, there can be a time lag between the start-up time of driving the correction lens unit 3 to the center position and the start-up time for focus control, which avoids excessive flow of electric current in the initial operation stage of the camera 1, and maloperation of the microprocessor.

Referring back to the microprocessor μC1, after the focus control in Step S35, it is judged whether the shutter 23 is opened based on a judgement as to whether the shutter open command signal is transmitted from the microprocessor μC2 (in Step S40). This judgement is repeated until the shutter open command signal is received (YES in Step S40).

When the shutter open command signal is transmitted (YES in Step S40), the shutter 23 is opened to start an image exposure (in Step S45). The timer 58 counts up time from the exposure start. When the optimum exposure time $t_{SS}$ lapses, a shutter close command signal is transmitted to the microprocessor μC2 (in Step S50). Thereafter, this sequence returns to Step S5.

On the side of the microprocessor μC2, after Step #45, a routine "Shake Correction" is executed (in Step #50). It is judged whether the shutter 23 is closed based on a judgement as to whether the shutter close command signal is transmitted (in Step #55). If the shutter close command signal is not transmitted (NO in Step #55), the sequence returns to Step #50 without closing the shutter 23. The routine "Shake Correction" is repeated until the optimum exposure time $t_{SS}$ lapses. When the shutter close command signal is transmitted (YES in Step #55), the shutter 23 is closed (in Step #60). The sequence returns to Step #5.

Figure 16:
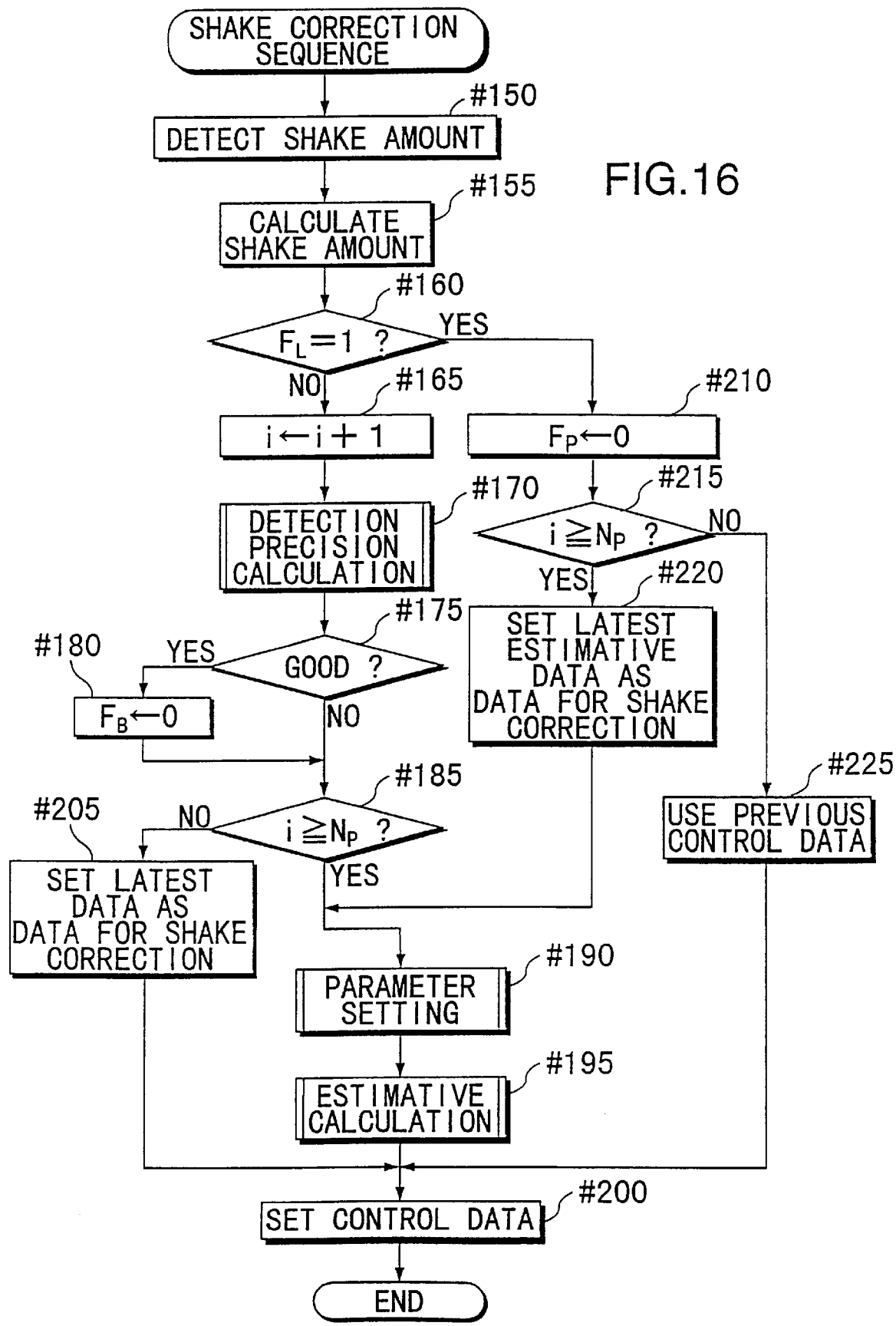
FIG. 16 is a flowchart showing a routine "Shake Correction" in the control sequence.

FIG. 16 is a flowchart of the routine "Shake Correction". When this routine starts, an object image is picked up for a shake detection (in Step #150). A shake amount calculation in the horizontal and vertical directions with respect to the picked up object image is executed (in Step #155). At this time, when a contrast value of the picked up image is lower than a predetermined threshold value, the low contrast flag $F_L$ is set at "1".

It is judged whether the low contrast flag $F_L$ is set at "1" (in Step #160). If the low contrast flag $F_L$ is not set at "1" (NO in Step #160), the counter "i" is incremented by 1 (in Step #165), and a routine "Detection Precision Calculation" is executed (in Step #170).

Thereafter, it is judged (evaluated) whether a shake detection precision of the shake detecting unit 4 is high (in Step #175). If the evaluation is high (YES in Step #175), the evaluation flag $F_B$ is set at "0" (in Step #180), and if the evaluation is low (NO in Step #175), the routine skips Step #180 and goes to Step #185.

Next, it is judged whether the counter "i" equals to or is larger than the estimative calculation number $N_P$ (in Step #185). If $i \geq N_P$ (YES in Step #185), a routine "Parameter Setting" is executed (in Step #190), and then a routine "Estimative Calculation" is executed (in Step #195).

Thereafter, the control data $SD_{PH}$, $SD_{PV}$ are set in the drive control circuit 61 (in Step #200), and this routine ends. A drive signal in each of the horizontal and vertical directions is generated, and the horizontal correction lens 31 and the vertical correction lens 32 are moved in accordance with the corresponding drive signal. It should be noted that the control data $SD_{GH}$, $SD_{GV}$ from the correction gain setter 54 are set in the drive control circuit 61 when the control data $SD_{PH}$, $SD_{PV}$ from the target position setter 53 are set for the first time in the drive control circuit 61.

If $i<N_P$ (NO in Step #185), the latest shake amounts in the horizontal and vertical directions stored in the memory 56 are respectively set as the estimative shake amounts in the horizontal and vertical directions (in Step #205). After the respective shake amounts in the horizontal and vertical directions are converted into target angular position data and subject to a correction with a correction coefficient based on the ambient temperature, the routine proceeds to Step #200. The target angular position data in the horizontal and vertical directions are set in the drive control circuit 61 as the control data $SD_{PH}$, $SD_{PV}$ to move the horizontal correction lens 31 and the vertical correction lens 32 in such a direction as to cancel the shake amounts in the horizontal and vertical directions in accordance with the latest shake amounts in the horizontal and vertical directions stored in the memory 56.

When the low contrast flag $F_L$ is set at "1" (YES in Step #160), the allowance flag $F_P$ is set at "0" (in Step #210). It is judged whether $i \geq N_P$ (in Step #215). If $i \geq N_P$ (YES in Step #215), the latest estimative shake amounts in the horizontal and vertical directions stored in the memory 56 are set as shake amount data in the horizontal and vertical directions for a shake correction (in Step #220). Thereafter, this routine proceeds to Step #190. The horizontal correction lens 31 and the vertical correction lens 32 are moved in such a direction as to cancel the shake amounts in the horizontal and vertical directions in accordance with the latest estimative shake amounts in the horizontal and vertical directions stored in the memory 56.

If $i<N_P$ (NO in Step #215), the previously set control data $SD_{PH}$, $SD_{PV}$ are utilized as current control data $SD_{PH}$, $SD_{PV}$ (in Step #225). This routine goes to Step #200. The previously set control data $SD_{PH}$, $SD_{PV}$ are set in the drive control circuit 61 to stop the horizontal correction lens 31 and the vertical correction lens 32 at the current position.

Figure 17:
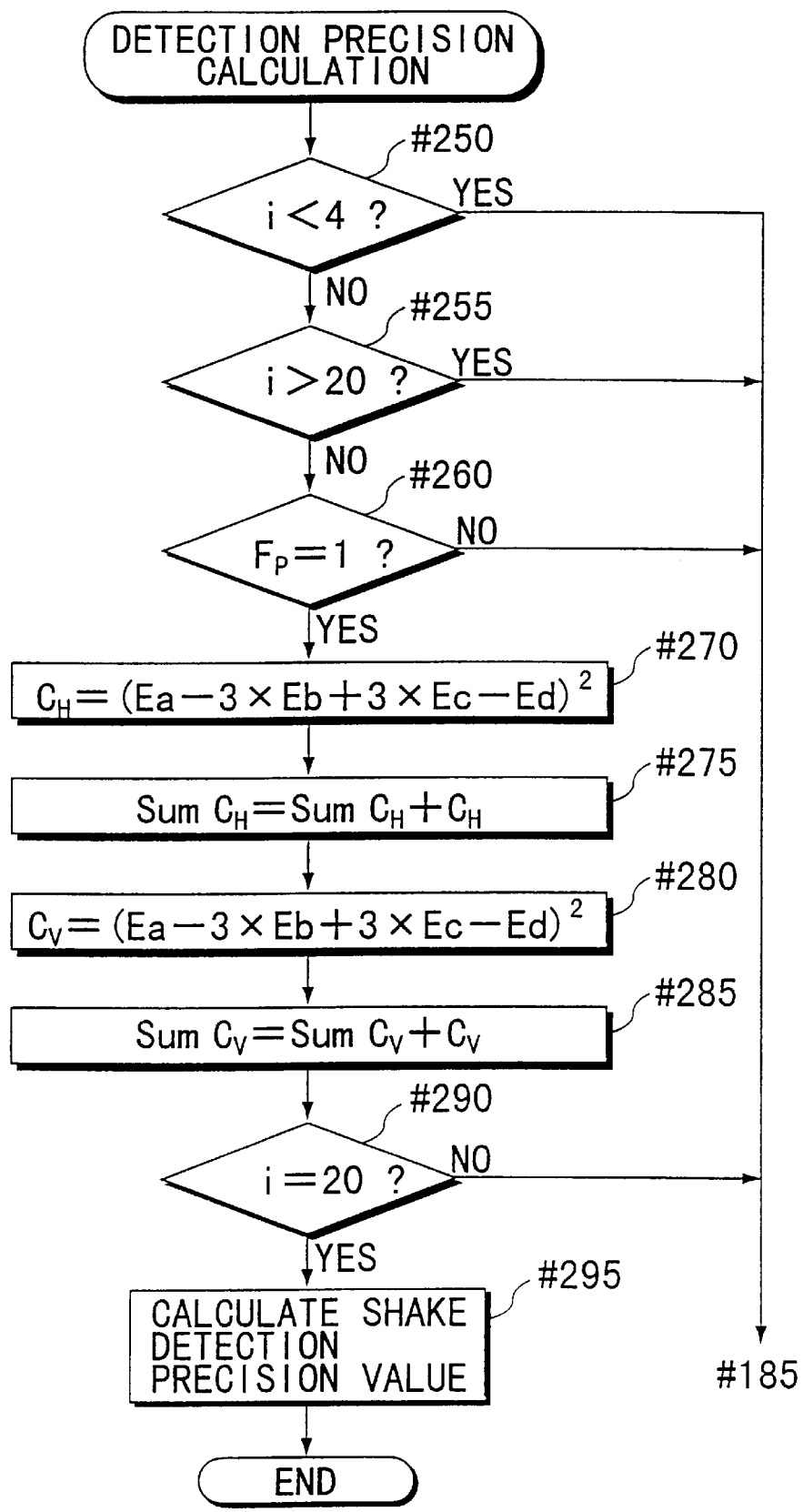
FIG. 17 is a flowchart showing a routine "Detection Precision Calculation" in the control sequence.

FIG. 17 is a flowchart of the routine "Detection Precision Calculation". When this routine starts, it is judged whether the counter "i" is smaller than 4 (in Step #250). If i<4 (YES in Step #250), this routine proceeds to Step #185 in FIG. 16. If $i \geq 4$ (NO in Step #250), it is judged whether i>20 (in Step #255).

If i>20 (YES in Step #255), this routine proceeds to Step #185 in FIG. 16. If i<20 (NO in Step #255), it is judged whether the allowance flag $F_P$ is set at "1" (in Step #260). If the allowance flag $F_P$ is not set at "1" (NO in Step #260), this routine proceeds to Step #185 in FIG. 16.

If the allowance flag $F_P$ is set at "1" (YES in Step #260), a shake acceleration variation C in the horizontal direction is calculated in accordance with Equation (5) to calculate a squared value $C_H$ of the shake acceleration variation C in the horizontal direction (in Step #270). The squared value $C_H$ in the horizontal direction is added for summation as: $SumC_H = SumC_H + C_H$ (in Step #275).

Similar to the horizontal summation, a shake acceleration variation C in the vertical direction is calculated in accordance with Equation (5) to calculate a squared value $C_V$ of the shake acceleration variation C in the vertical direction (in Step #280). The squared value $C_V$ in the vertical direction is added for summation as : $SumC_V = SumC_V + C_V$ (in Step #285).

It is judged whether i=20 (in Step #290). If i=20 (YES in Step #290), a shake detection precision value (detection variation) of the shake detecting unit 4 is calculated by adding the sum of the squared shake acceleration variations in the horizontal direction and the sum of the squared shake acceleration variations in the vertical direction and dividing the sum by two (in Step #295), and this routine ends.

On the other hand, if i≠20 (NO in Step #290), this routine proceeds to Step #185 in FIG. 16.

Figure 18:
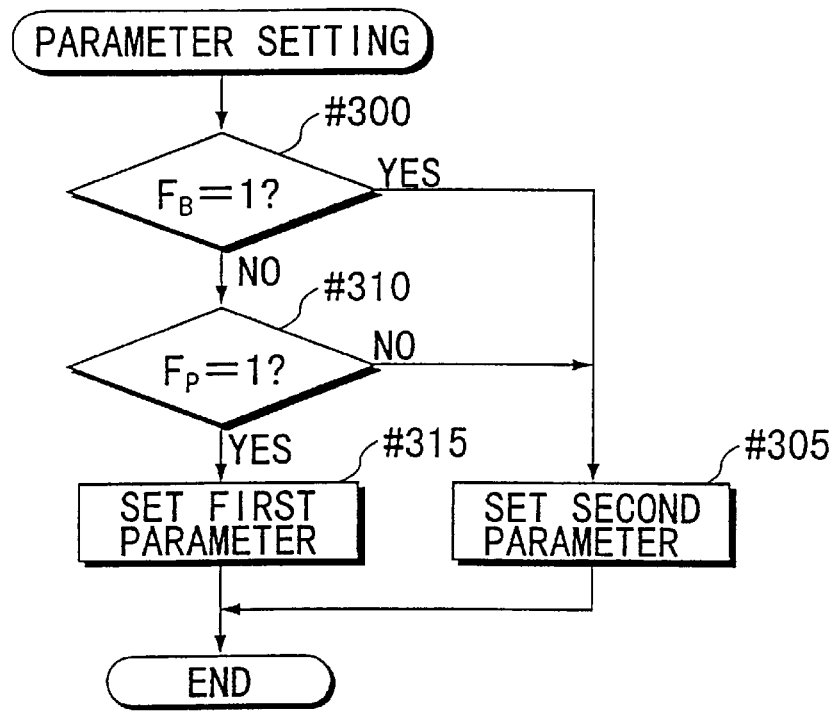
FIG. 18 is a flowchart showing a routine "Parameter Setting" in the control sequence.

FIG. 18 is a flowchart of the routine "Parameter Setting". When this routine starts, it is judged whether the evaluation flag $F_B$ is set at "1" (in Step #300). When the evaluation flag $F_B$ is set at "1" (YES in Step #300), the second parameters Tv2, Tα2 are set in the data extractor 512, and the second parameter k2 is set in the estimative shake amount calculator 513 (in Step #305), and this routine ends.

When the evaluation flag $F_B$ is not set at "1" (NO in Step #300), it is judged whether the allowance flag $F_P$ is set at "1" (in Step #310). If the allowance flag $F_P$ is set at "1" (YES in Step #310), the first parameters Tv1, Tα1 are set in the data extractor 512, and the first parameter k1 is set in the estimative shake amount calculator 513 (in Step #315), and this routine ends. On the other hand, when the allowance flag $F_P$ is not set at "1" (NO in Step #310), this routine proceeds to Step #305.

Figure 19:
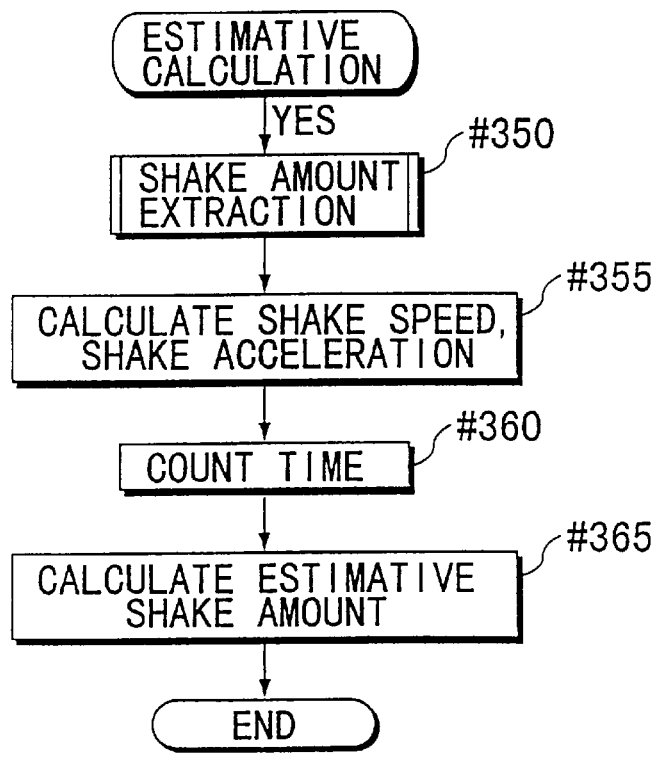
FIG. 19 is a flowchart showing a routine "Estimative Calculation" in the control sequence.

FIG. 19 is a flowchart of the routine "Estimative Calculation". When this routine starts, a routine "Shake Amount Extraction" to be described later is executed (in Step #350). After plural shake amount data necessary for the estimative shake amount calculation are extracted from the memory 56 in Step #350, the shake speed V1 and the shake acceleration rate α in the horizontal and vertical directions are calculated based on the extracted shake amount data (in Step #355). Subsequently, the timer 58 counts up time (in Step #360). The time Tp is calculated in accordance with the equation: Tp=(tr−ta+td), and the estimative shake amount $E_P$ in the horizontal and vertical directions is calculated in accordance with Equation (4) (in Step #365). Next, the estimative shake amounts in the horizontal and vertical directions are converted into target angular position data in the horizontal and vertical directions and subject to a correction with a correction coefficient based on the ambient temperature, and this routine ends. The target angular position data in the horizontal and vertical directions are set in the drive control circuit 61 as the control data $SD_{PH}$, $SD_{PV}$ to move the horizontal correction lens 31 and the vertical correction lens 32 in such a direction as to cancel the shake amounts in the horizontal and vertical directions.

Figure 20:
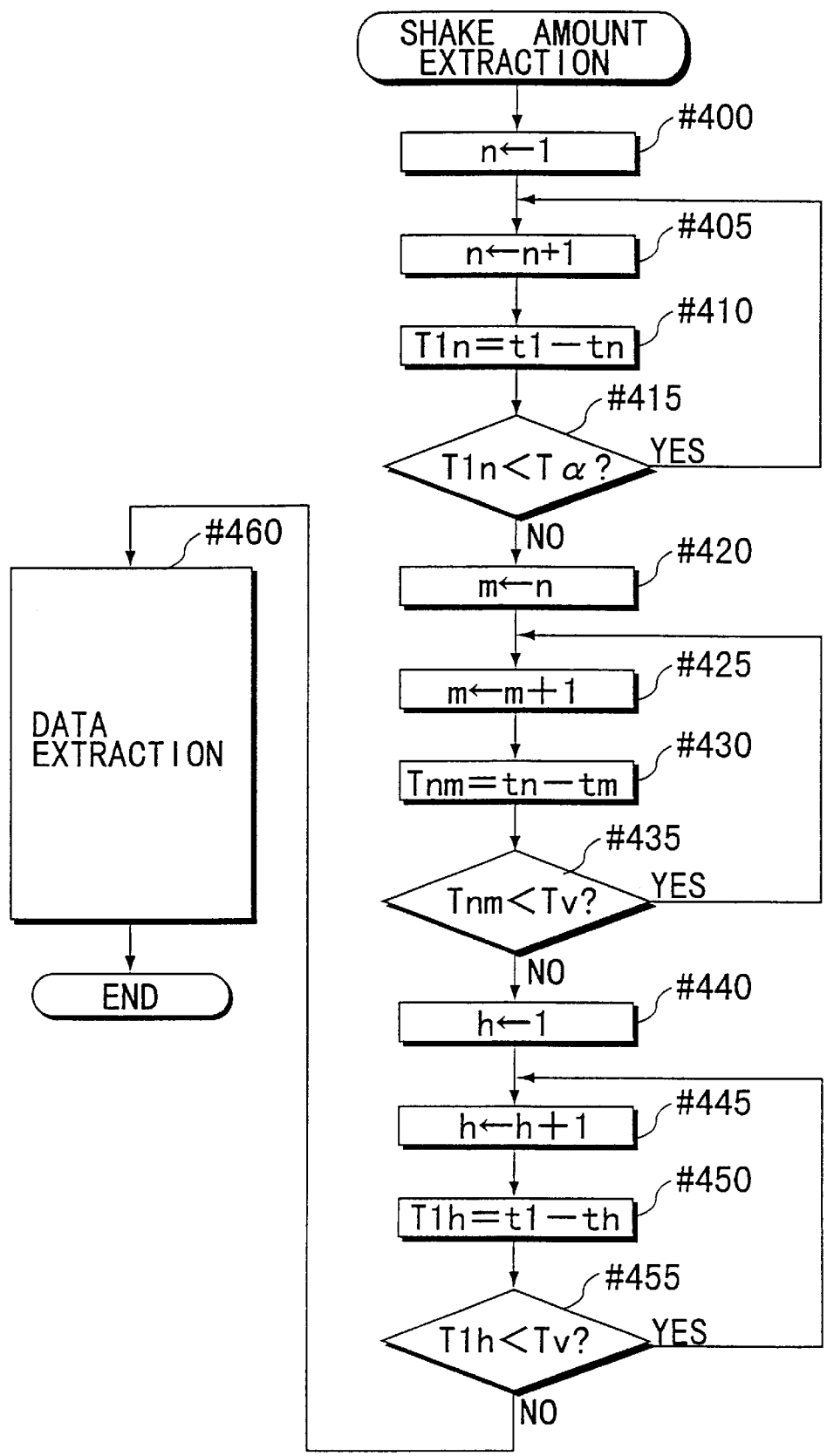
FIG. 20 is a flowchart showing a routine "Shake Amount Extraction" in the control sequence.

FIG. 20 is a flowchart of the routine "Shake Amount Extraction". It should be noted that respective points of time correspond to points of time in FIG. 5.

When this routine starts, a counter "n" is set at "1" (in Step #400), and is incremented by one (in Step #405). A time space T1n (=t1−tn) is calculated (in Step #410). Subsequently, it is judged whether the time space T1n is shorter than the time space Tα (in Step #415). When it is judged that T1n<Tα (YES in Step #415), this routine returns to Step #405.

If it is judged that T1n≧Tα (NO in Step #415), a counter "m" is set at the value set in the counter "n" (in Step #420). When getting out of the loop of Steps #405 to #415, the value in the counter "n" is set, and the search of the time tc in FIG. 5 to specify the shake amount Ec is completed.

Thereafter, the counter "m" is incremented by one (in Step #425), and a time space Tnm (=tn−tm) is calculated (in Step #430). Subsequently, it is judged whether the time space Tnm is shorter than the time space Tv (in Step #435). If it is judged that Tnm<Tv (YES in Step #435), the routine returns to Step #425.

If it is judged that Tnm≧Tv (NO in Step #435), a counter "h" is set at "1" (in Step #440). When getting out of the loop of Steps #425 to #435, the value in the counter "m" is set, and the search of the time td in FIG. 5 to specify the shake amount Ed is completed.

Thereafter, the counter "h" is incremented by one (in Step #445), and a time space T1h (=tl−th) is calculated (in Step #450). Subsequently, it is judged whether the time space T1h is shorter than the time space Tv (in Step #455). When it is judged that T1<Tv (YES in Step #455), the routine returns to Step #445.

If it is judged that T1h≧Tv (NO in Step #455) the routine goes to Step #460 where data extraction is executed. When getting out of the loop of Steps #445 to #455, the value in the counter "h" is set.

In Step #460, the shake amount at the time tn specified by the value set in the counter "n" in the case of the judgement result in Step #415 being negative is extracted and set as the shake amount Ec at the time tc in FIG. 5. Likewise, the shake amount at the time tm specified by the value set in the counter "m" in the case of the judgement result in Step #435 being negative is extracted and set as the shake amount Ed at the time td in FIG. 5. Further, the shake amount at the time th specified by the value set in the counter "h" in the case of the judgement result in Step #455 being negative is extracted and set as the shake amount Eb at the time tb shown in FIG. 5. The shake amount data Ea at the latest time t1 (ta) is always extracted. After extracting all the data in Step #460, the routine ends.

In this embodiment, the shake detection precision value is used to change over the first parameter and the second parameter. Alternatively, the shake detection precision value is used to judge whether the shake detection output by the shake detecting unit 4 is usable as reliable data. Specifically, when the shake detection precision is high (i.e., the detection variation is smaller than the evaluation reference value), it is judged that the shake detection output is usable as reliable data, while use of the shake detection output is prohibited when the shake detection precision is low (i.e., the detection variation is larger than the evaluation reference value).

As an altered form, a shake correction may be executed based on the estimative shake amount when the shake detection output is judged to be reliable, while executing the shake correction based on the instant shake amount data when the shake detection output is judged to be unreliable.

In the foregoing embodiment, the shake detection precision is determined based on a shake acceleration variation. Alternatively, the shake detection precision may be determined based on a shake speed variation (i.e., a shake acceleration rate). In this case, at least three shake amount data are necessary to obtain a shake acceleration rate.

Alternatively, assuming that an integration period for producing each shake amount data is constant, a mathematical expression necessary for obtaining a shake speed variation can be simplified, similar to the calculation of shake acceleration variation.

In this embodiment, the first parameter and the second parameter are selectively used. Alternatively, three or more kinds of parameters may be used to obtain an improved estimative shake amount.

In the foregoing embodiment, the shake detection precision of the shake detecting unit 4 is evaluated by calculating a shake detection precision value based on shake acceleration variations and comparing the shake detection precision value with a predetermined evaluation reference value.

Alternatively, the shake detection precision may be judged based on a contrast value of an object light image sensed by the shake sensor 42.

In a shake detecting device with a CCD such as the shake sensor 42, the shake detection precision varies depending on the contrast value of an object image picked up by the CCD. Specifically, when the contrast value of the object image is high, the shake detection precision is high, and the shake detection precision is low when the contrast is low. Accordingly, direct use of the contrast value of the object image may enable evaluation of the shake detection precision without the use of shake amount data.

More specifically, the shake detection precision may be evaluated by calculating a contrast value of an object image based on detection outputs of the shake detecting unit 4, averaging obtained plural contrast values, and comparing an average contrast value with a predetermined value. In this case, it is judged that the shake detection precision is high when the average contrast value is larger than the predetermined value, while being judged that the shake detection precision is low when the average contrast value is smaller than the predetermined value.

As mentioned above, it can be seen in advance whether a shake detection has been executed with a high precision. Accordingly, the shake correction can be properly performed. The use of shake detection output can be prohibited when the shake detection precision is low.

The shake detection are performed a given number of times to obtain shake acceleration variations, and the obtained shake acceleration variations are added for summation, which can provide proper statistical reliability.

The variation in the shake acceleration rate can be calculated in the simplified manner, i.e., without need of division, thereby reducing the calculation time.

The term of shake acceleration rate in the estimative shake amount calculation can be adjusted in accordance with shake detection precision, thereby assuring a more accurate shake correction.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. A shake correcting device for use in an optical apparatus, the shake correcting device comprising:
   a detector for cyclically detecting a shake of the optical apparatus relative to an object;
   a calculator for calculating a degree of variation of a plurality of detection results of the detector, and for calculating a detection precision based on a thus calculated degree of variation; and
   a corrector for executing a shake correction of the optical apparatus based on the detection precision calculated by the calculator.

2. A shake correcting device according to claim 1, wherein the degree of variation is calculated based on shake acceleration variations.

3. A shake correcting device according to claim 2, wherein the calculator adds a square of one shake acceleration variation and a square of another shake acceleration variation for summation to calculate the degree of variation.

4. A shake correcting device according to claim 2, wherein the calculator adds an absolute value of one shake acceleration variation and an absolute value of another shake acceleration variation for summation to calculate the degree of variation.

5. A shake correcting device according to claim 1, wherein the calculator calculates the degree of variation assuming that a detection interval of the detector is constant.

6. A shake correcting device according to claim 1, wherein the optical apparatus is a camera.

7. A shake detecting device for use in an optical apparatus, the shake detecting device comprising:
   a detector for cyclically detecting a shake of the optical apparatus relative to an object cyclically;
   an evaluator for evaluating a detection precision based on a plurality of detection results of the detector;
   a setter for setting a condition for calculation of a shake amount based on the thus evaluated detection precision; and
   a calculator for calculating a shake amount using the thus set condition.

8. A shake detecting device according to claim 7, wherein the shake amount calculated by the calculator is an estimation.

9. A shake detecting device according to claim 7, wherein the condition includes an extraction time space defining a range in which detection results of the detector are extracted for the shake amount calculation.

10. A shake detecting device according to claim 9, wherein there are selectively provided a first extraction time space and a second extraction time space greater than the first extraction time space, and the setter sets the first extraction time space when the evaluated detection precision is higher than a predetermined value, and sets the second extraction time space when the evaluated detection precision is lower than the predetermined value.

11. A shake detecting device according to claim 7, wherein the calculator executes the shake amount calculation in accordance with an equation including a shake speed and a shake acceleration, and the condition includes a coefficient of the term of shake acceleration.

12. A shake detecting device according to claim 11, wherein there are selectively provided a first coefficient and a second coefficient smaller than the first coefficient, and the setter sets the first coefficient when the evaluated detection precision is higher than a predetermined value, and sets the second coefficient when the evaluated detection precision is lower than the predetermined value.

13. A shake detecting device according to claim 7, wherein the optical apparatus is a camera.

14. A method for correcting a shake of an optical apparatus, the method comprising the steps of:
   cyclically detecting the shake of the optical apparatus relative to an object;
   calculating a degree of variation of a plurality of resulting detection results;
   calculating a detection precision based on the thus calculated degree of variation; and
   executing a shake correction of the optical apparatus based on the thus calculated detection precision.

15. A method according to claim 14, wherein the optical apparatus is a camera.

16. A method for detecting a shake of an optical apparatus, the method comprising the steps of:
   cyclically detecting the shake of the optical apparatus relative to an object;
   evaluating a detection precision based on a plurality of resulting detection results;
   setting a condition for calculation of a shake amount based on the thus evaluated detection precision; and
   calculating the shake amount using the thus set condition.

17. A method according to claim 16, wherein the optical apparatus is a camera.

* * * * *